(12) United States Patent
Cheng et al.

(10) Patent No.: US 12,388,587 B2
(45) Date of Patent: Aug. 12, 2025

(54) TRANSPORT BLOCK (TB) DETERMINATION FOR TB TRANSMISSION OVER MULTIPLE SLOTS

(71) Applicant: Telefonaktiebolaget LM Ericsson (publ), Stockholm (SE)

(72) Inventors: Jung-Fu Cheng, Fremont, CA (US); Reem Karaki, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 257 days.

(21) Appl. No.: 17/923,640

(22) PCT Filed: May 7, 2021

(86) PCT No.: PCT/SE2021/050435
§ 371 (c)(1),
(2) Date: Nov. 7, 2022

(87) PCT Pub. No.: WO2021/225512
PCT Pub. Date: Nov. 11, 2021

(65) Prior Publication Data
US 2023/0188277 A1    Jun. 15, 2023

Related U.S. Application Data

(60) Provisional application No. 63/021,323, filed on May 7, 2020.

(51) Int. Cl.
*H04L 47/43* (2022.01)
*H04L 1/00* (2006.01)
*H04L 5/00* (2006.01)

(52) U.S. Cl.
CPC .......... *H04L 5/0044* (2013.01); *H04L 1/0061* (2013.01); *H04L 1/0067* (2013.01); *H04L 47/43* (2022.05)

(58) Field of Classification Search
CPC ....... H04L 5/003; H04L 5/004; H04L 5/0044; H04L 1/0056; H04L 1/0067; H04L 1/004;
(Continued)

(56) References Cited

U.S. PATENT DOCUMENTS

2003/0074476 A1* 4/2003 Kim ..................... H04L 69/04
709/246
2009/0010240 A1* 1/2009 Papasakellariou .... H04W 16/02
370/344
(Continued)

FOREIGN PATENT DOCUMENTS

CN          102550112    * 10/2010  ............ H04W 72/12
WO    WO-2019174406 A1 *  9/2019  ............ H04L 47/70
(Continued)

OTHER PUBLICATIONS

International Search Report and Written Opinion dated Jul. 28, 2021 for International Application No. PCT/SE2021/050435 filed May 7, 2021; consisting of 14 pages.
(Continued)

*Primary Examiner* — Warner Wong
(74) *Attorney, Agent, or Firm* — Weisberg I.P. Law, P.A.

(57) ABSTRACT

A method, system and apparatus are disclosed for a network node to communicate with a wireless device (WD). The network node and/or WD are configured to determine a transport block, TB, size based at least in part on a number of resource elements in a plurality of time slots; determine a segmentation of a transport block, TB, having the TB size, the segmentation producing a plurality of segmented code blocks, CBs; determine a channel coding for each of the plurality of segmented CBs, the channel coding producing a plurality of coded CBs; and one of transmit and receive the
(Continued)

plurality of coded CB s over the plurality of time slots according to the determined segmentation and the determined channel coding.

19 Claims, 15 Drawing Sheets

(58) Field of Classification Search
CPC ... H04L 1/0061; H04L 47/43; H04L 67/1074; H04W 28/00; H04W 28/26; H04W 72/02; H04W 72/04; H04W 72/0446; H04W 72/52
See application file for complete search history.

(56) References Cited

U.S. PATENT DOCUMENTS

| | | | | |
|---|---|---|---|---|
| 2012/0320805 | A1* | 12/2012 | Yang | H04L 5/0053 370/280 |
| 2014/0078944 | A1* | 3/2014 | Yang | H04L 5/0055 370/280 |
| 2014/0105076 | A1* | 4/2014 | Yang | H04J 3/1694 370/280 |
| 2014/0313950 | A1* | 10/2014 | Yang | H04L 5/14 370/280 |
| 2014/0362832 | A1* | 12/2014 | Rudolf | H04L 1/1822 370/336 |
| 2015/0063179 | A1* | 3/2015 | Yang | H04L 5/14 370/280 |
| 2015/0131579 | A1* | 5/2015 | Li | H04L 1/1858 370/329 |
| 2017/0164384 | A1* | 6/2017 | Wang | H04L 5/001 |
| 2017/0201968 | A1 | 7/2017 | Nam et al. | |
| 2018/0205497 | A1* | 7/2018 | Wang | H03M 13/1102 |
| 2020/0037317 | A1* | 1/2020 | Guo | H04L 1/0003 |
| 2020/0145024 | A1* | 5/2020 | Wang | H04L 1/0007 |
| 2020/0245320 | A1* | 7/2020 | Yoshioka | H04L 5/0044 |
| 2021/0250887 | A1* | 8/2021 | Xiong | H04W 48/20 |
| 2022/0022184 | A1* | 1/2022 | Lu | H04L 1/08 |
| 2022/0416939 | A1* | 12/2022 | Zhu | H04L 1/0042 |

FOREIGN PATENT DOCUMENTS

| | | |
|---|---|---|
| WO | 2020037257 A1 | 2/2020 |
| WO | 2020197749 A1 | 10/2020 |

OTHER PUBLICATIONS

3GPP TS 38.214 V16.1.0; 3rd Generation Partnership Project; Technical Specification Group Radio Access Network; NR; Physical layer procedures for data (Release 16); Mar. 2020; consisting of 151 pages.

ETSI TS 138 212 V15.8.0; 5G; NR; Multiplexing and channel coding (3GPP TS 38.212 version 15.8.0 Release 15); Jan. 2020; consisting of 106 pages.

3GPP TSG RAN WG1 Meeting #89 R1-1706901; Title: TB mapping for slot aggregation; Agenda Item: 7.1.3.3.1; Source: Huawei, HiSilicon; Document for: Discussion and decision; Date and Location: May 15-19, 2017, Hangzhou, China; consisting of 7 pages.

3GPP TSG RAN WG1 Meeting #90 R1-1714547; Title: Code Block Segmentation for LDPC Codes; Source: Ericsson; Agenda Item: 6.1.4.1.2; Document for: Discussion and Decision; Date and Location: Aug. 21-25, 2017; Prague, P. R. Czechia; consisting of 4 pages.

3GPP TSG RAN WG1 Meeting #90bis R1-1717992; Title: TB Size and Code Block Segmentation for NR Data Channel; Source: Ericsson; Agenda Item: 7.4.1.3; Document for: Discussion and Decision; Date and Location: Oct. 9-13, 2017, Prague, CZ; consisting of 10 pages.

European Communication dated Jun. 20, 2025 for Application No. 21726733.5, consisting of 4 pages.

* cited by examiner

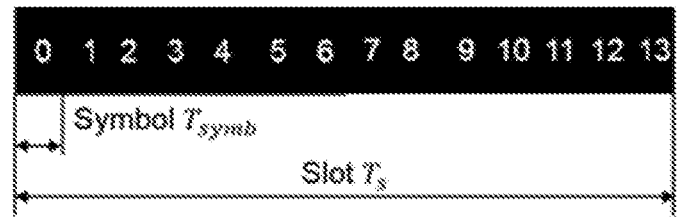
FIG. 2
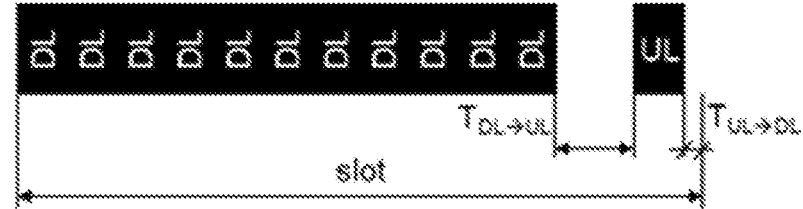
FIG. 3

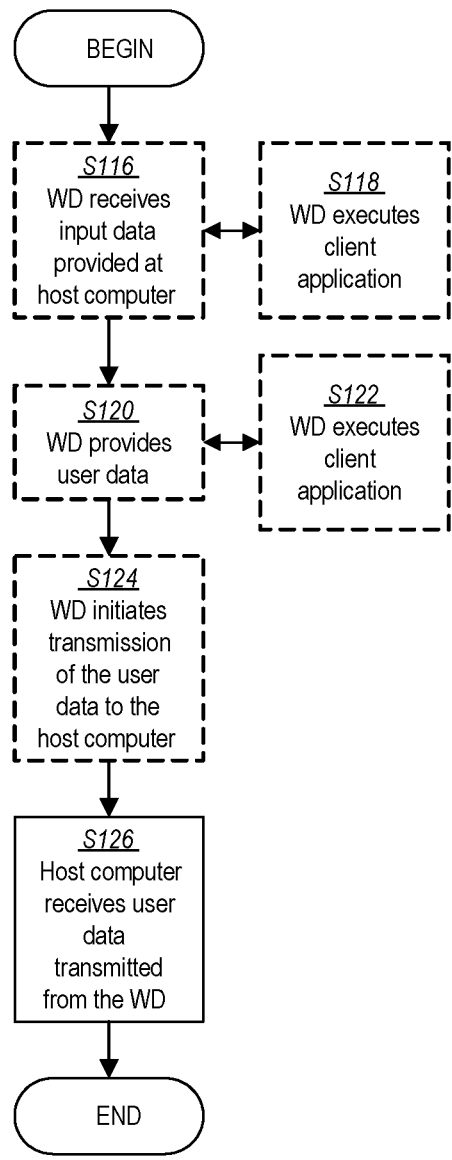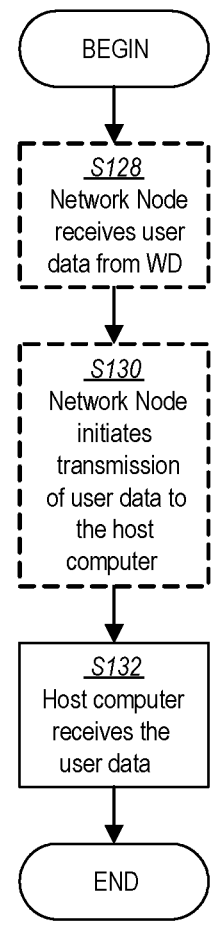
FIG. 12
FIG. 13

```
┌─────────────────────────────────────────────────────────────┐
│ Determine a transport block, TB, size based at least in part │
│                      on a number of                          │
│       resource elements in a plurality of time slots         │
│                           S138                               │
└─────────────────────────────────────────────────────────────┘
                              ↓
┌─────────────────────────────────────────────────────────────┐
│ Determine a segmentation of a TB having the TB size, the    │
│         segmentation producing a plurality of segmented CBs  │
│                           S140                               │
└─────────────────────────────────────────────────────────────┘
                              ↓
┌─────────────────────────────────────────────────────────────┐
│ Determine a channel coding for each of the plurality of     │
│ segmented CBs, the channel coding producing a plurality of  │
│                         coded CBs                            │
│                           S142                               │
└─────────────────────────────────────────────────────────────┘
                              ↓
┌─────────────────────────────────────────────────────────────┐
│ One of transmit and receive the plurality of coded CBs over │
│ the plurality of time slots according to the determined     │
│        segmentation and the determined channel coding        │
│                           S144                               │
└─────────────────────────────────────────────────────────────┘
```

FIG. 16

```
┌─────────────────────────────────────────────────────────────┐
│ Determine a transport block, TB, size based at least in part │
│                      on a number of                          │
│       resource elements in a plurality of time slots         │
│                           S146                               │
└─────────────────────────────────────────────────────────────┘
                              ↓
┌─────────────────────────────────────────────────────────────┐
│ Determine a segmentation of a TB having the TB size, the    │
│         segmentation producing a plurality of segmented CBs  │
│                           S148                               │
└─────────────────────────────────────────────────────────────┘
                              ↓
┌─────────────────────────────────────────────────────────────┐
│ Determine a channel coding for each of the plurality of     │
│ segmented CBs, the channel coding producing a plurality of  │
│                         coded CBs                            │
│                           S150                               │
└─────────────────────────────────────────────────────────────┘
                              ↓
┌─────────────────────────────────────────────────────────────┐
│ One of transmit and receive the plurality of coded CBs over │
│ the plurality of time slots according to the determined     │
│        segmentation and the determined channel coding        │
│                           S152                               │
└─────────────────────────────────────────────────────────────┘
```

TRANSPORT BLOCK (TB) DETERMINATION FOR TB TRANSMISSION OVER MULTIPLE SLOTS

CROSS-REFERENCE TO RELATED APPLICATIONS

This application is a Submission Under 35 U.S.C. § 371 for U.S. National Stage Patent Application of International Application No.: PCT/SE2021/050435, filed May 7, 2021 entitled "TRANSPORT BLOCK (TB) DETERMINATION FOR TB TRANSMISSION OVER MULTIPLE SLOTS," which claims priority to U. S. Provisional Application No. 63/021,323, filed May 7, 2020, entitled "TRANSPORT BLOCK (TB) DETERMINATION FOR SINGLE TB TRANSMISSION OVER MULTIPLE SLOTS," the entireties of both of which are incorporated herein by reference.

FIELD

The present disclosure relates to wireless communications, and in particular, to constructing a transport block for transmission over a time duration that exceeds a single time slot.

BACKGROUND

New Radio (NR) Numerologies

Similar to 3rd Generation Partnership Project (3GPP) Long-Term Evolution (LTE), New Radio (NR) (also known as "5G") uses Orthogonal Frequency Division Multiplexing (OFDM) in the downlink (DL) (i.e., from a network node or base station, to a wireless device (WD)). The basic NR physical resource over an antenna port can thus be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element (RE) corresponds to one OFDM subcarrier during one OFDM symbol interval.

Multiple OFDM numerologies, p, are supported in NR as given by Table 1, where the subcarrier spacing, M, and the cyclic prefix for a carrier bandwidth part are configured by different higher layer parameters for downlink and uplink, respectively.

Study of required changes to NR using existing DL/uplink (UL) NR waveform to support operation between 52.6 GHz and 71 GHz.

Study of applicable numerology including subcarrier spacing, channel bandwidth (BW) (including maximum BW), and their impact to frequency range 2 (FR2) physical layer design to support system functionality considering practical radio frequency (RF) impairments [RAN1, RAN4].

Identify potential critical problems to physical signal/channels, if any [RAN1].

Study of channel access mechanism, considering potential interference to/from other nodes, assuming beam-based operation, in order to comply with the regulatory requirements applicable to unlicensed spectrum for frequencies between 52.6 GHz and 71 GHz [RAN1].

It is clarified that potential interference impact, if identified, may require interference mitigation solutions as part of the channel access mechanism. Higher SCSs have been proposed for supporting NR from 52.6 GHz to 71 GHz, e.g., 960kHz and higher SCSs.

Slot Structure for NR

In the time domain, downlink and uplink transmissions in NR will be organized into equally-sized subframes of 1ms each similar to LTE. A subframe is further divided into multiple slots of equal duration. The slot length for subcarrier spacing $\Delta f=(15 \times 2^\mu)$ kHz is $\frac{1}{2}$ $\mu$ ms. There is only one slot per subframe for $\Delta f=15$ kHz and a slot consists of 14 OFDM symbols.

An NR slot consists of 14 OFDM symbols. In FIG. 2, $T_s$ and $T_{symb}$ denote the slot and OFDM symbol duration, respectively. In addition, the symbols within a slot may be classified as either UL, DL or flexible to accommodate DL/UL the transient period and both DL and UL transmissions. Potential variations are shown in FIG. 3.

Furthermore, NR also defines mini-slots (referred to as Type B physical downlink shared channel (PDSCH)/physical uplink shared channel (PUSCH) mapping in 3GPP specifications). Mini-slots are shorter than slots and can start at any symbol. Mini-slots are used if the transmission duration of a slot is too long or the occurrence of the next slot start (slot alignment) is too late. Applications of mini-slots include among others latency critical transmissions (in this case both mini-slot length and frequent opportunity of

TABLE 1

Supported transmission numerologies.

| | Subcarrier spacing $\Delta f = 2^\mu \cdot 15$ [kHz] | | | | |
|---|---|---|---|---|---|
| | 15 kHz | 30 kHz | 60 kHz | 120 kHz | 240 kHz |
| Slot duration | 1000 µs | 500 µs | 250 µs | 125 µs | 62.5 µs |
| OFDM symbol, duration | 66.67 µs | 33.33 µs | 16.67 µs | 8.33 µs | 4.17 µs |
| Cyclic prefix, duration | 4.69 µs | 2.34 µs | 1.17 µs | 0.59 µs | 0.29 µs |
| OFDM symbol including cyclic prefix | 71.35 µs | 35.68 µs | 17.84 µs | 8.92 µs | 4.46 µs |
| Max carrier bandwidth (assuming 4k FFT) | 50 MHz | 100 MHz | 200 MHz | 400 MHz | 800 MHz |

3GPP NR Release-16 supports subcarrier spacings (SCSs) up to 240kHz SCS, which can be used for frequencies up to the 52.6GHz band. For 3GPP Release-17, 3GPP radio access network (RAN) has agreed to support NR from 52.6 GHz to 71 GHz, which includes the following:

mini-slot are important) and unlicensed spectrum where a transmission should start immediately after listen-before-talk succeeded (here the frequent opportunity of mini-slot is especially important). An example of mini-slots is shown in FIG. 4.

Transport Block Preparation

In the NR system specifications, the data transported by the PDSCH or the PUSCH is organized as a transport block (TB). In order to detect whether the transport block is correctly received at the receiver, a cyclic redundancy check (CRC) checksum is appended to the transport block. The total length of the transport block and the CRC checksum needs to be one of the channel codeword lengths (CWL). When the transport block size is small enough to be handled as a single low density parity check (LDPC) codeword, the transport block CRC checksum size is set to 16. This CRC attachment procedure for small transport blocks is illustrated in FIG. 5. Hence, when the transport block size is no greater than 3824, the transport block size is set to one of the LDPC codeword lengths listed in Table 2 minus 16. Alternatively, for convenience, the 3GPP NR technical specifications (TS) TS 38.214 contains a list of LDPC codeword lengths minus 16, as reproduced in Table 1, such that the transport block size can be searched directly in the table.

TABLE 2

The NR LDPC codeword lengths (CWL) when the transport block size is no greater than 3824.

| Index | CWL |
|---|---|
| 1 | 40 |
| 2 | 48 |
| 3 | 56 |
| 4 | 64 |
| 5 | 72 |
| 6 | 80 |
| 7 | 88 |
| 8 | 96 |
| 9 | 104 |
| 10 | 112 |
| 11 | 120 |
| 12 | 128 |
| 13 | 136 |
| 14 | 144 |
| 15 | 152 |
| 16 | 160 |
| 17 | 168 |
| 18 | 176 |
| 19 | 184 |
| 20 | 192 |
| 21 | 200 |
| 22 | 208 |
| 23 | 224 |
| 24 | 240 |
| 25 | 256 |
| 26 | 272 |
| 27 | 288 |
| 28 | 304 |
| 29 | 320 |
| 30 | 336 |
| 31 | 352 |
| 32 | 368 |
| 33 | 384 |
| 34 | 400 |
| 35 | 424 |
| 36 | 448 |
| 37 | 472 |
| 38 | 496 |
| 39 | 520 |
| 40 | 544 |
| 41 | 568 |
| 42 | 592 |
| 43 | 624 |
| 44 | 656 |
| 45 | 688 |
| 46 | 720 |
| 47 | 752 |
| 48 | 784 |
| 49 | 824 |
| 50 | 864 |
| 51 | 904 |
| 52 | 944 |
| 53 | 1000 |
| 54 | 1048 |
| 55 | 1080 |
| 56 | 1144 |
| 57 | 1176 |
| 58 | 1208 |
| 59 | 1240 |
| 60 | 1272 |
| 61 | 1304 |
| 62 | 1336 |
| 63 | 1368 |
| 64 | 1432 |
| 65 | 1496 |
| 66 | 1560 |
| 67 | 1624 |
| 68 | 1688 |
| 69 | 1752 |
| 70 | 1816 |
| 71 | 1880 |
| 72 | 1944 |
| 73 | 2040 |
| 74 | 2104 |
| 75 | 2168 |
| 76 | 2232 |
| 77 | 2296 |
| 78 | 2424 |
| 79 | 2488 |
| 80 | 2552 |
| 81 | 2616 |
| 82 | 2680 |
| 83 | 2744 |
| 84 | 2808 |
| 85 | 2872 |
| 86 | 2992 |
| 87 | 3120 |
| 88 | 3256 |
| 89 | 3384 |
| 90 | 3512 |
| 91 | 3640 |
| 92 | 3768 |
| 93 | 3840 |

TABLE 3

The NR small transport block sizes (no greater than 3824 bits). (Reproduced from Table 5.1.3.2-1 of 3GPP TS 38.214).

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |

TABLE 3-continued

The NR small transport block sizes (no greater than 3824 bits).
(Reproduced from Table 5.1.3.2-1 of 3GPP TS 38.214).

| Index | TBS |
|---|---|
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

In modern high data rate communications systems, large amount of data bits in the transport block can be transmitted by a PDSCH or a PUSCH at a time. Since it is impractical to implement channel codecs hardware of very large block lengths, it may be necessary to divide a large transport block into multiple smaller units referred to as the code blocks (CB), whose sizes can be handled by the channel codec hardware. When a transport block is segmented into several code blocks, additional CRC checksums for the individual code blocks are further added to enable early stopping of the channel decoder and code block group based operations. This two-level CRC attachment procedure is illustrated in FIG. 6. The CRC checksums for the transport block and the code block can in general be of different sizes or computed based on different CRC check equations.

Note that the code block segmentation procedure takes as its input the transport block bits and the associated transport block CRC checksum bits. Hence, the last code block contains the transport block CRC checksum bits as illustrated in FIG. 6.

In the NR specification:
If the transport block size is no greater than 3824, no code block segmentation is performed and the transport block CRC checksum size is set to 16.
If the transport block size is greater than 3824, the transport block CRC checksum size is set to 24. Furthermore,
If the code rate is no greater than 1/4, code block segmentation is performed using LDPC codeword lengths up to 3840 bits.
Otherwise,
If the transport block size is no greater than 8424, no code block segmentation is performed.
If the transport block size is greater than 8424, code block segmentation is performed using LDPC codeword lengths up to 8448 bits.

The code block CRC checksum length is always 24 bits in NR.

Scheduling and Transport Block Size Determination Procedure

In the 3GPP NR standard, downlink control information (DCI) is received over the physical layer downlink control channel (PDCCH). The PDCCH may carry DCI in messages with different formats. DCI format 0_0 and 0_1 are DCI messages used to convey uplink grants to the WD for transmission of the physical layer data channel in the uplink (PUSCH) and DCI format 1_0 and 1_1 are used to convey downlink grants for transmission of the physical layer data channel on the downlink (PDSCH). Other DCI formats (2_0, 2_1, 2_2 and 2_3) are used for other purposes such as transmission of slot format information, reserved resource, transmit power control information, etc.

A PDCCH candidate is searched within a common or WD-specific search space which is mapped to a set of time and frequency resources referred to as a control resource set (CORESET) instance. The search spaces within which PDCCH candidates must be monitored are configured to the WD via radio resource control (RRC) signaling. A monitoring periodicity is also configured for different search space sets. A CORESET is defined by the frequency domain location and size as well as the time domain size. A CORESET in NR can be 1, 2 or 3 OFDM symbols in duration.

The scheduling DCI for PDSCH or PUSCH provides to the WD, among other information:
The number of scheduled OFDM symbols in the time domain, denoted by $N_{symb}^{sh}$;
The number allocated primary resource blocks (PRBs) in the frequency domain, denoted by $n_{PRB}$;

The code rate, denoted by R;
The modulation order, denoted by $Q_m$; and
The number of spatial multiplexing layers, denoted by v.

The above information is further used by the WD to determine the transport block size to be carried by the PDSCH or the PUSCH via the following transport block size determination procedure.

Step 1

The WD first determines the number of REs, denoted by $N_{RE}$, within the scheduled slot using the number of scheduled OFDM symbols in the time domain, the number allocated PRBs in the frequency domain, and other higher layer configured parameters.

Details: $N_{RE}=n_{PRB} \cdot \min(156, N_{SC}^{RB} \cdot N_{symb}^{sh} - N_{DMRS}^{PRB} - N_{oh}^{PRB})$, where Step 3

$N_{SC}^{RB}=12$ is the number of subcarriers in a PRB, $N_{DMRS}^{PRB}$ is the number of REs for the demodulation reference signal (DM-RS) per PRB in the scheduled duration including the overhead of the DM-RS CDM groups without data, and $N_{oh}^{PRB}$ is the overhead per PRB configured by higher layer signaling.

Step 2

The WD further determines the intermediate number of information bits, denoted by $N_{info}$, using the code rate, the modulation order, and the number of spatial multiplexing layers.

Details: $N_{info}=N_{RE} \cdot R \cdot Q_m \cdot v$.

Step 3

If $N_{info}$ is no greater than 3824, no code block segmentation is needed and the transport block CRC checksum size is set to 16. The transport block size is determined from the smallest LDPC codeword length listed in Table 1 that can contain both the $N_{info}$ bits and the 16 transport block CRC checksum.

Details: The intermediate number of information bits is first quantized to $$N'_{info} = \max\left(24, 2^n \cdot \left\lfloor \frac{N_{info}}{2^n} \right\rfloor\right),$$

where n is determined as $\max(3, \lfloor \log_2 N_{info} \rfloor - 6)$. The smallest codeword length, denoted by $L_{CW}$, listed in Table 1 Table that is no less than $N'_{info}+16$ is selected and the transport block size is set to $L_{CW}-16$.

Step 4

If $N_{info}$ is greater than 3824, the transport block CRC checksum size is set to 24.

If the code rate is no greater than ¼ or if $N_{info}$ is greater than 8424, code block segmentation is performed. Otherwise, the transport block is not segmented.

When the code rate is no greater than ¼, LDPC codeword lengths up to 3840 bits is used for the code blocks. When $N_{info}$ is greater than 8424, LDPC codeword lengths up to 8448 bits is used for the code blocks.

Details: The intermediate number of information bits is first quantized to $$N'_{info} = \max\left(3840, 2^n \cdot \text{round}\left(\frac{N_{info} - 24}{2^n}\right)\right),$$

where n is determined as $\lfloor \log_2(N_{info}-24) \rfloor - 5$. The transport block size is determined as $$TBS = 8C \cdot \left\lceil \frac{N'_{info} + 24}{8C} \right\rceil - 24,$$

where the number of code blocks, denoted by C, is determined as follows.

If code rate R≤¼, the number of code blocks is determined as $$C = \left\lceil \frac{N'_{info} + 24}{3816} \right\rceil.$$

Otherwise, the number of code blocks is determined as $$C = \left\lceil \frac{N'_{info} + 24}{8424} \right\rceil.$$

CBG Based Retransmission

NR supports in addition to transport block based re-transmissions also Code Block Group (CBG) based re-transmissions to selectively re-transmit parts of the transport block.

The CBGs may be constructed as follows.

The maximum number N of CBG(s) per TB is configured by RRC signaling

The number M of CBG(s) in the TB equals to min(C, N), where C is the number of CB(s) within the TB.

For CBG construction

The first Mod(C,M) CBG(s) out of total M CBG(s) include ceil(C/M) CB(s) per CBG

The remaining M-Mod(C,M) CBG(s) include floor(C/M) CB(s) per CBG.

For initial transmission and retransmission, each CBG of a TB has the same set of CB(s).

N=2, 4, 6, or 8 for 1 code word (CW) and N=1, 2, 3, or 4 for 2 CWs

A CBG transmission information (CBGTI) field can be configured to be present in the DCI to indicate what CBG(s) to retransmit.

Channel Coding and Rate Matching for Code Blocks in NR

After code block segmentation, the individual coded blocks are channel encoded and rate matched separately. In the NR specification, the total number of coded bits available for transmission of the transport block is denoted by G. These available coded bits available for transmission are divided as evenly as possible amongst the code blocks scheduled for transmission.

Details: Let C' be the total number of code blocks scheduled for transmission. A first set of code blocks are rate matched to $$\left\lfloor \frac{G}{C' \cdot Q_m \cdot v} \right\rfloor \cdot Q_m \cdot v$$

bits each. A second set of code blocks are rate matched to $$\left\lceil \frac{G}{C' \cdot Q_m \cdot v} \right\rceil \cdot Q_m \cdot v$$

bits each. (The number of coded symbols for each of the two sets of code blocks are $$\left\lfloor \frac{G}{C' \cdot Q_m \cdot v} \right\rfloor \cdot v$$

symbols and $$\left\lceil \frac{G}{C' \cdot Q_m \cdot v} \right\rceil \cdot v$$

symbols, respectively.)

The preparation, channel encoding and rate matching for a large transport block transmission over a scheduled slot in NR is summarized in FIG. 7. After transport block CRC attachment, code block segmentation may be performed to produce several code blocks of equal size. After code block CRC attachment, the code blocks may be channel encoded and rate matched to as equal number of coded bits as possible.

The processing delays in terms of symbols as shown in the table below become larger for higher SCS, even though the absolute time might be smaller.

| PDSCH Configuration | HARQ Timing | 15 kHz SCS | 30 kHz SCS | 60 kHz SCS | 120 kHz SCS |
|---|---|---|---|---|---|
| Front-loaded DMRS only | N1 | 8 | 10 | 17 | 20 |
| Front-loaded + additional DMRS | N1 | 13 | 13 | 20 | 24 |
| Frequency-first RE-mapping | N2 | 10 | 12 | 23 | 36 |

Note:
N1: # of OFDM symbols from end of PDSCH until beginning of PUCCH
N2: # of OFDM symbols from end of PDCCH (UL grant) until beginning of PUSCH The processing delays have an impact on the scheduling behavior. NR operates with limited HARQ processes. The initial transmission of a TB is confined within single PUSCH/PDSCH that may not exceed 14 symbols. New data cannot be scheduled unless there is a free hybrid automatic repeat request (HARQ) process to be used for the TB transmission or unacknowledged data has to be discarded.

For higher frequency band using higher SCS (960 kHz or more), it would put a lot of constraint on hardware implementation to either (1) increase the number of HARQ processes to avoid situations where the transmissions need to be stalled due to lack of free HARQ processes and long delays for processing or (2) reducing the processing time even further.

In practical receiver implementations (the WD for the PDSCH and the network node for the PUSCH), hardware design may have restrictions such that certain units of receiver processing cannot span over a slot boundary. As one nonlimiting example, the encoded bits of a LDPC code block may need to be restricted to within a single slot.

SUMMARY

Some embodiments advantageously provide methods, systems, and apparatuses for constructing a single transport block for transmission over a time duration that can exceed a single slot.

Scheduling a single TB that spans over multiple slots is not supported by the current NR specification. Embodiments provide a mechanism to enable that. The embodiments as described in this disclosure provide a means to cope with long processing delays, especially for high subcarrier spacings, without necessarily putting a lot of constraints on hardware implementations.

According to an aspect, a radio node is provided. The radio node is configured to determine a transport block, TB, size based at least in part on a number of resource elements in a plurality of time slots; determine a segmentation of a transport block, TB, having the TB size, the segmentation producing a plurality of segmented CBs; determine a channel coding for each of the plurality of segmented code blocks, CBs, the channel coding producing a plurality of coded CBs; and one of transmit and receive the plurality of coded CBs over the plurality of time slots according to the determined segmentation and the determined channel coding.

In some embodiments of this aspect, the radio node is a wireless device, WD, and wherein the WD is configured to one of transmit the plurality of coded CBs on a Physical Uplink Shared Channel, PUSCH, scheduled over the plurality of time slots and receive the plurality of coded CBs on a Physical Downlink Shared Channel, PDSCH, scheduled over the plurality of time slots. In some embodiments of this aspect, the radio node is a radio network node and wherein the radio network node is configured to one of transmit the plurality of coded CBs on a Physical Downlink Shared Channel, PDSCH, scheduled over the plurality of time slots and receive the plurality of coded CBs on a Physical Uplink Shared Channel, PUSCH, scheduled over the plurality of time slots.

In some embodiments of this aspect, a number of orthogonal frequency-division multiplexing, OFDM, symbols that are scheduled in one of the plurality of time slots is not equal to a number of OFDM symbols that are scheduled in at least one other of the plurality of time slots. In some embodiments of this aspect, the radio node is configured to determine the TB size by being configured to determine the number of resource elements in the plurality of time slots as a sum of a number of resource elements scheduled in each of the plurality of time slots. In some embodiments of this aspect, the radio node is configured to determine the TB size by being configured to determine the number of resource elements in the plurality of time slots using an average of the number of orthogonal frequency division multiplexing, OFDM, symbols scheduled in each of the plurality of time slots.

In some embodiments of this aspect, the radio node is configured to when the TB is scheduled over more than one time slot determine a TB cyclic redundancy check, CRC, the TB CRC being appended to the TB prior to the segmentation that produces the plurality of segmented CBs. In some embodiments of this aspect, each of the produced plurality of segmented CBs are equally sized; and the radio node is configured to determine a rate matching of the produced plurality of coded CBs, the rate matching producing an equal number of coded bits per coded CB. In some embodiments of this aspect, at least one of the plurality of coded CBs crosses a time slot boundary.

In some embodiments of this aspect, the produced plurality of segmented CBs are equally sized; and the radio node (16, 22) is configured to determine a rate matching of the produced plurality of coded CBs, the rate matching producing an unequal number of coded bits per coded CB in at least two coded CBs of the plurality of coded CBs, each coded CB being restricted to one time slot. In some embodiments of this aspect, when at least two coded CBs of the plurality of coded CBs are within a same time slot, the radio node is configured to determine that the at least two coded CBs in the same time slot are rate matched into an equal number of coded bits per coded CB in the same time slot: and the at least two coded CBs having an unequal number of coded bits per coded CB are in different time slots.

In some embodiments of this aspect, the plurality of coded CBs are produced according to a division of a total number of the CBs scheduled for the one of the transmission and the reception into a plurality of CB sets, each CB set being transmitted within a respective time slot of the plurality of time slots. In some embodiments of this aspect, a number of CBs in an i-th CB set is based at least in part on a number of orthogonal frequency-division multiplexing, OFDM, symbols that are scheduled in a time slot i of the plurality of time slots. In some embodiments of this aspect, the number of CBs in the i-th CB set are determined using at least one of a rounding function, a ceiling function and a floor function. In some embodiments of this aspect, the produced plurality of segmented CBs are unequally sized; and the radio node is configured to determine a rate matching of the plurality of coded CBs, the rate matching producing an unequal number of coded bits per coded CB in at least two of the plurality of coded CBs, each coded CB being restricted to one time slot. In some embodiments of this aspect, when at least two coded CBs of the plurality of coded CBs are within a same time slot, the radio node is configured to determine that the at least two coded CBs in the same time slot are rate matched into an equal number of coded bits per coded CB in the same time slot: and the at least two coded CBs having an unequal number of coded bits per coded CB are in different time slots.

In some embodiments of this aspect, when the TB is scheduled over more than one time slot: the segmentation of the TB to produce the plurality of segmented CBs is regardless of the TB size; and a TB cyclic redundancy check, CRC, checksum size is 24 bits regardless of the TB size. In some embodiments of this aspect, the radio node is configured to when the TB is scheduled over more than one time slot: determine that a cyclic redundancy check, CRC, is not appended to the TB; and the segmentation of the TB to produce the plurality of segmented CBs is regardless of the TB size, the TB on which the segmentation is performed lacking a TB cyclic redundancy check, CRC. In some embodiments, the produced plurality of segmented CBs are unequally sized; and the radio node (16, 22) is configured to when the TB is scheduled over more than one time slot: determine a rate matching of the plurality of coded CBs, the rate matching producing an unequal number of coded bits per coded CB in at least two of the plurality of coded CBs, each coded CB being restricted to one time slot.

In some embodiments of this aspect, when at least two coded CBs of the plurality of coded CBs are within a same time slot, the radio node (16, 22) is configured to determine that the at least two coded CBs in the same time slot are rate matched into an equal number of coded bits per coded CB in the same time slot: and the at least two coded CBs having an unequal number of coded bits per coded CB are in different time slots. In some embodiments of this aspect, when the TB is scheduled over more than one time slot: a CB cyclic redundancy check, CRC, checksum size is greater than 24 bits for each of the plurality of segmented CBs regardless of the TB size. In some embodiments of this aspect, the CB CRC checksum size is one of 32 bits and 28 bits for each of the plurality of segmented CBs.

In some embodiments of this aspect, the radio node is further configured to determine a number of CBs and an associated CB size for each time slot separately, the determination being based at least in part on a number of orthogonal frequency-division multiplexing, OFDM, symbols that are scheduled in the respective time slot. In some embodiments of this aspect, the radio node comprises processing circuitry and a radio interface, the processing circuitry and/or the radio interface configured to implement any one or more of the above.

According to another aspect of the present disclosure, a method implemented by a radio node is provided. The method comprises: determining a transport block, TB, size based at least in part on a number of resource elements in a plurality of time slots; determining a segmentation of a transport block, TB, having the TB size, the segmentation producing a plurality of segmented CBs; determining a channel coding for each of the plurality of segmented CBs, the channel coding producing a plurality of coded CBs; and one of transmitting and receiving the plurality of coded CBs over the plurality of time slots according to the determined segmentation and the determined channel coding.

In some embodiments, the radio node is a wireless device, WD (22), and wherein the transmission of the plurality of coded CBs is on a Physical Uplink Shared Channel, PUSCH, scheduled over the plurality of time slots and the reception of the plurality of coded CBs is on a Physical Downlink Shared Channel, PDSCH, scheduled over the plurality of time slots. In some embodiments, the radio node is a radio network node and wherein the transmission of the plurality of coded CBs is on a Physical Downlink Shared Channel, PDSCH, scheduled over the plurality of time slots and the reception of the plurality of coded CBs is on a Physical Uplink Shared Channel, PUSCH, scheduled over the plurality of time slots. In some embodiments, a number of orthogonal frequency-division multiplexing, OFDM, symbols that are scheduled in one of the plurality of time slots is not equal to a number of OFDM symbols that are scheduled in at least one other of the plurality of time slots.

In some embodiments, determining the TB size comprises determining the number of resource elements in the plurality of time slots as a sum of a number of resource elements scheduled in each of the plurality of time slots. In some embodiments, determining the TB size comprises determining the number of resource elements in the plurality of time slots using an average of the number of orthogonal frequency division multiplexing, OFDM, symbols scheduled in each of the plurality of time slots. In some embodiments, the method further includes when the TB is scheduled over more than one time slot: determining a TB cyclic redundancy check, CRC, the TB CRC being appended to the TB prior to the segmentation that produces the plurality of segmented CBs. In some embodiments, each of the produced plurality of segmented CBs are equally sized; and the method further comprising determining a rate matching of the produced plurality of coded CBs, the rate matching producing an equal number of coded bits per coded code block, CB.

In some embodiments, at least one of the plurality of coded CBs crosses a time slot boundary. In some embodiments, the produced plurality of segmented CBs are equally sized; and the method further comprising determining a rate matching of the plurality of coded CBs, the rate matching producing an unequal number of coded bits per coded CB in at least two coded CBs of the plurality of coded CBs, each coded CB being restricted to one time slot. In some embodiments, when at least two coded CBs of the plurality of coded CBs are within a same time slot, the method further comprises determining that the at least two coded CBs in the same time slot are rate matched into an equal number of coded bits per coded CB in the same time slot: and the at least two coded CBs having an unequal number of coded bits per coded CB are in different time slots.

In some embodiments, the plurality of coded CBs are produced according to a division of a total number of the CBs scheduled for the one of the transmission and the reception into a plurality of CB sets, each CB set being transmitted within a respective time slot of the plurality of time slots. In some embodiments, a number of CBs in an i-th CB set is based at least in part on a number of orthogonal frequency-division multiplexing, OFDM, symbols that are scheduled in a time slot i of the plurality of time slots. In some embodiments, the number of CBs in the i-th CB set are determined using at least one of a rounding function, a ceiling function and a floor function. In some embodiments, the produced plurality of segmented CBs are unequally sized; and the method further comprises determining a rate matching of the plurality of coded CB s, the rate matching producing an unequal number of coded bits per coded CB in at least two of the plurality of coded CBs, each coded CB being restricted to one time slot.

In some embodiments, when at least two coded CBs of the plurality of coded CBs are within a same time slot, the method further comprises determining that the at least two coded CBs in the same time slot are rate matched into an equal number of coded bits per coded CB in the same time slot: and the at least two coded CBs having an unequal number of coded bits per coded CB are in different time slots. In some embodiments, when the TB is scheduled over more than one time slot: the segmentation of the TB to produce the plurality of segmented CBs is regardless of the TB size; and a TB cyclic redundancy check, CRC, checksum size is 24 bits regardless of the TB size.

In some embodiments, the method comprises, when the TB is scheduled over more than one time slot: determining that a cyclic redundancy check, CRC, is not appended to the TB; and wherein the segmentation of the TB to produce the plurality of segmented CBs is regardless of the TB size, the TB on which the segmentation is performed lacking a TB cyclic redundancy check, CRC. In some embodiments, the produced plurality of segmented CBs are unequally sized; and when the TB is scheduled over more than one time slot: the method further comprises determining a rate matching of the plurality of coded CBs, the rate matching producing an unequal number of coded bits per coded CB in at least two of the plurality of coded CBs, each coded CB being restricted to one time slot. In some embodiments, when at least two coded CBs of the plurality of coded CBs are within a same time slot, the method further comprises determining that the at least two coded CBs in the same time slot are rate matched into an equal number of coded bits per coded CB in the same time slot: and the at least two coded CBs having an unequal number of coded bits per coded CB are in different time slots.

In some embodiments, when the TB is scheduled over more than one time slot: a CB cyclic redundancy check, CRC, checksum size is greater than 24 bits for each of the plurality of segmented CBs regardless of the TB size. In some embodiments, the CB CRC checksum size is one of 32 bits and 28 bits for each of the plurality of segmented CBs. In some embodiments, the method further comprises determining a number of CBs and an associated CB size for each time slot separately, the determination being based at least in part on a number of orthogonal frequency-division multiplexing, OFDM, symbols that are scheduled in the respective time slot.

According to yet another aspect, a computer readable medium is provided. The computer readable medium comprises computer instructions, the computer instructions configured to perform any one or more of the methods above.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 2 is a schematic diagram of an exemplary NR slot according to the principles in the present disclosure;

FIG. 3 is a schematic diagram of exemplary NR slot variations according to the principles in the present disclosure;

FIG. 12 is a flowchart illustrating exemplary methods implemented in a communication system including a host computer, a network node and a wireless device for receiving user data from the wireless device at a host computer according to some embodiments of the present disclosure;

FIG. 13 is a flowchart illustrating exemplary methods implemented in a communication system including a host computer, a network node and a wireless device for receiving user data at a host computer according to some embodiments of the present disclosure;

FIG. 16 is a flowchart of an exemplary process in a network node for constructing a single transport block for transmission over a time duration that exceeds a single time slot according to some embodiments of the present disclosure;

FIG. 17 is a flowchart of an exemplary process in a wireless device for constructing a single transport block for transmission over a time duration that exceeds a single time slot according to some embodiments of the present disclosure;

DETAILED DESCRIPTION

Figure 1:
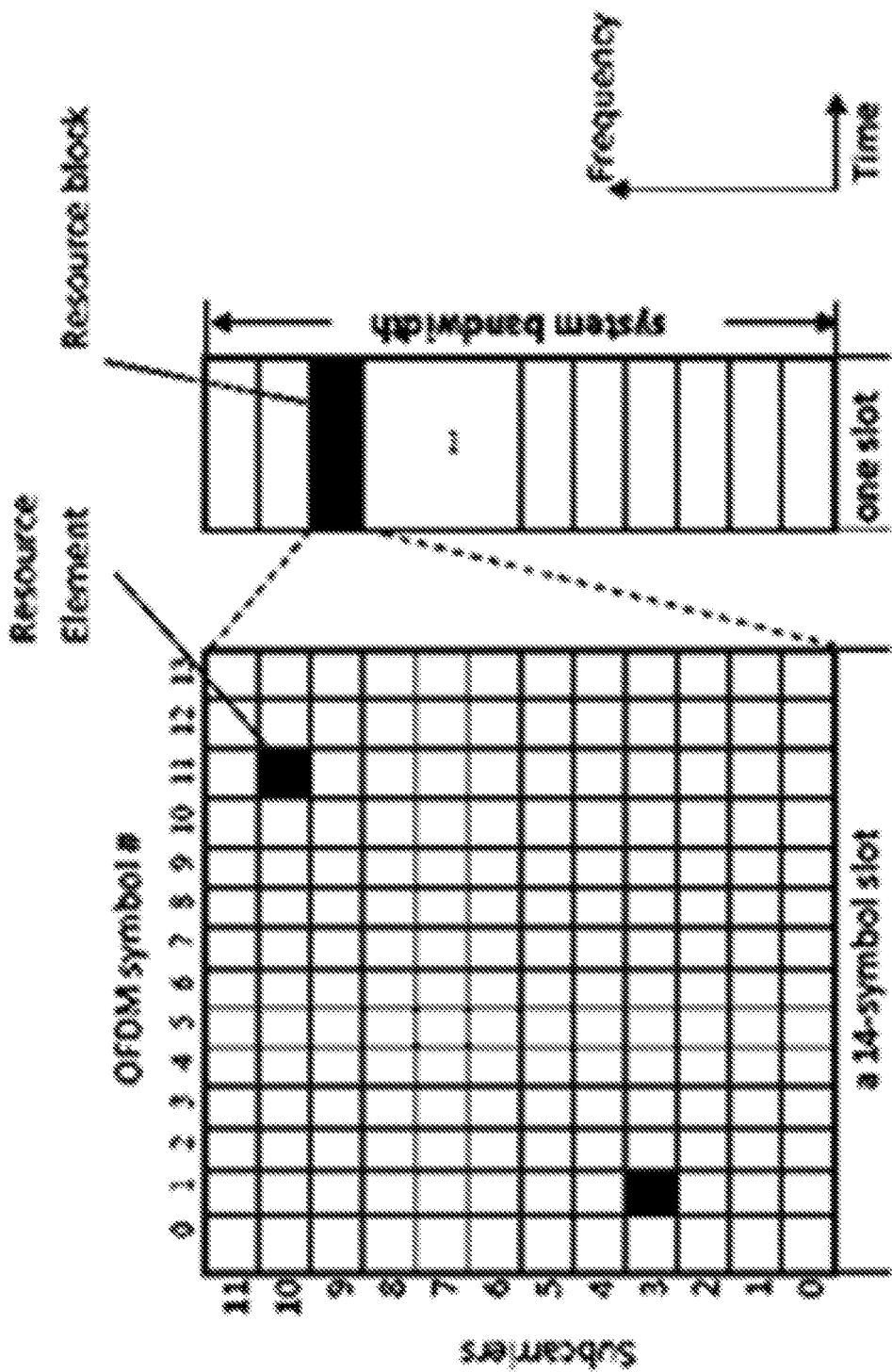
FIG. 1 is a schematic diagram of an exemplary NR physical resource grid according to the principles in the present disclosure.
Figure 4:
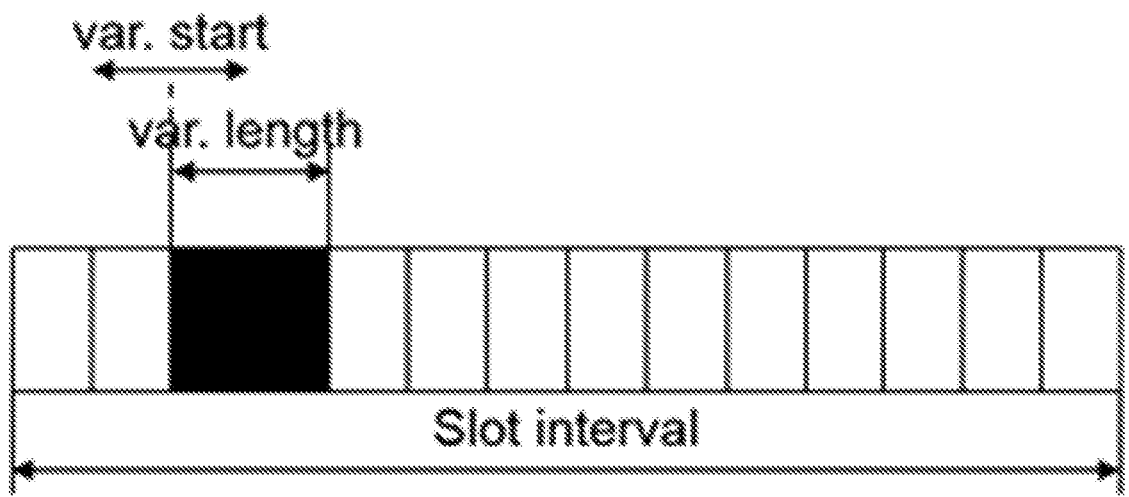
FIG. 4 is a schematic diagram of an exemplary mini-slot with 2 OFDM symbols according to the principles in the present disclosure.
Figure 5:
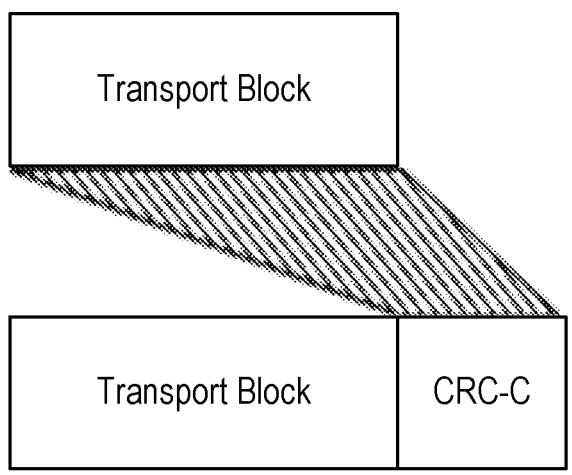
FIG. 5 is a schematic diagram of an exemplary CRC attachment for small transport blocks according to the principles in the present disclosure.
Figure 6:
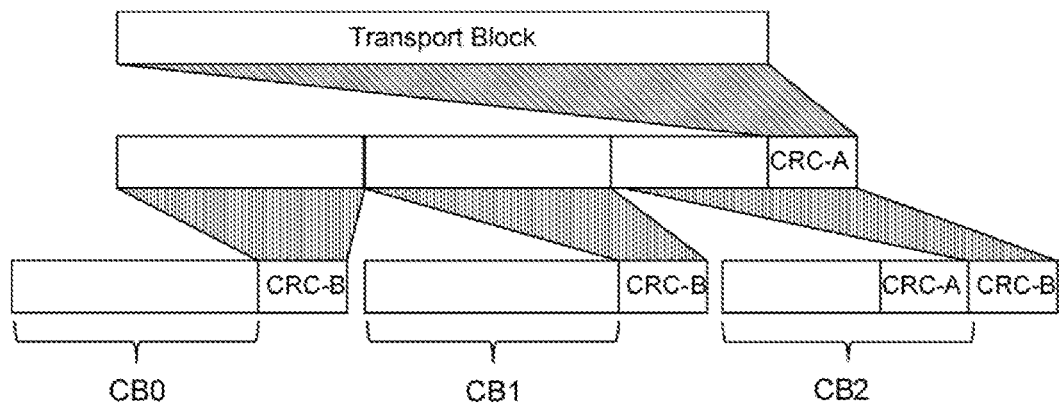
FIG. 6 is a schematic diagram of an exemplary two-level CRC attachment method for NR code block segmentation according to the principles in the present disclosure.
Figure 7:
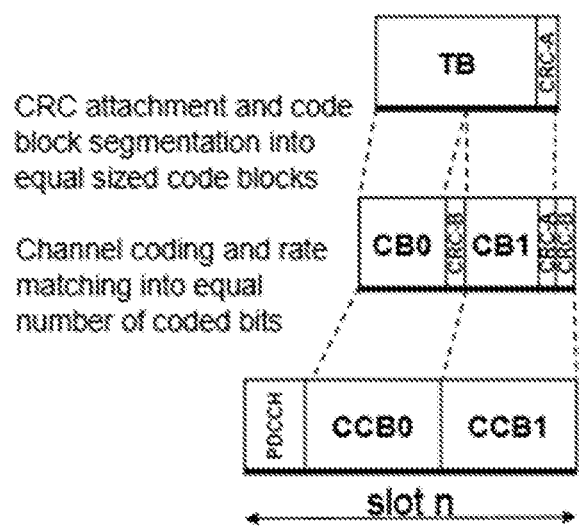
FIG. 7 is a schematic diagram of an exemplary preparation, channel encoding and rate matching method for a large transport block transmission over a scheduled slot in NR according to the principles in the present disclosure.

Before describing in detail exemplary embodiments, it is noted that the embodiments reside primarily in combinations of apparatus components and processing steps related to constructing a single transport block for transmission over a time duration that exceeds a single time slot. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide constructing a single transport block for transmission over a time duration that exceeds a single time slot which may not be provided for in a standard such as 3GPP's NR wireless communication standard.

Figure 8:
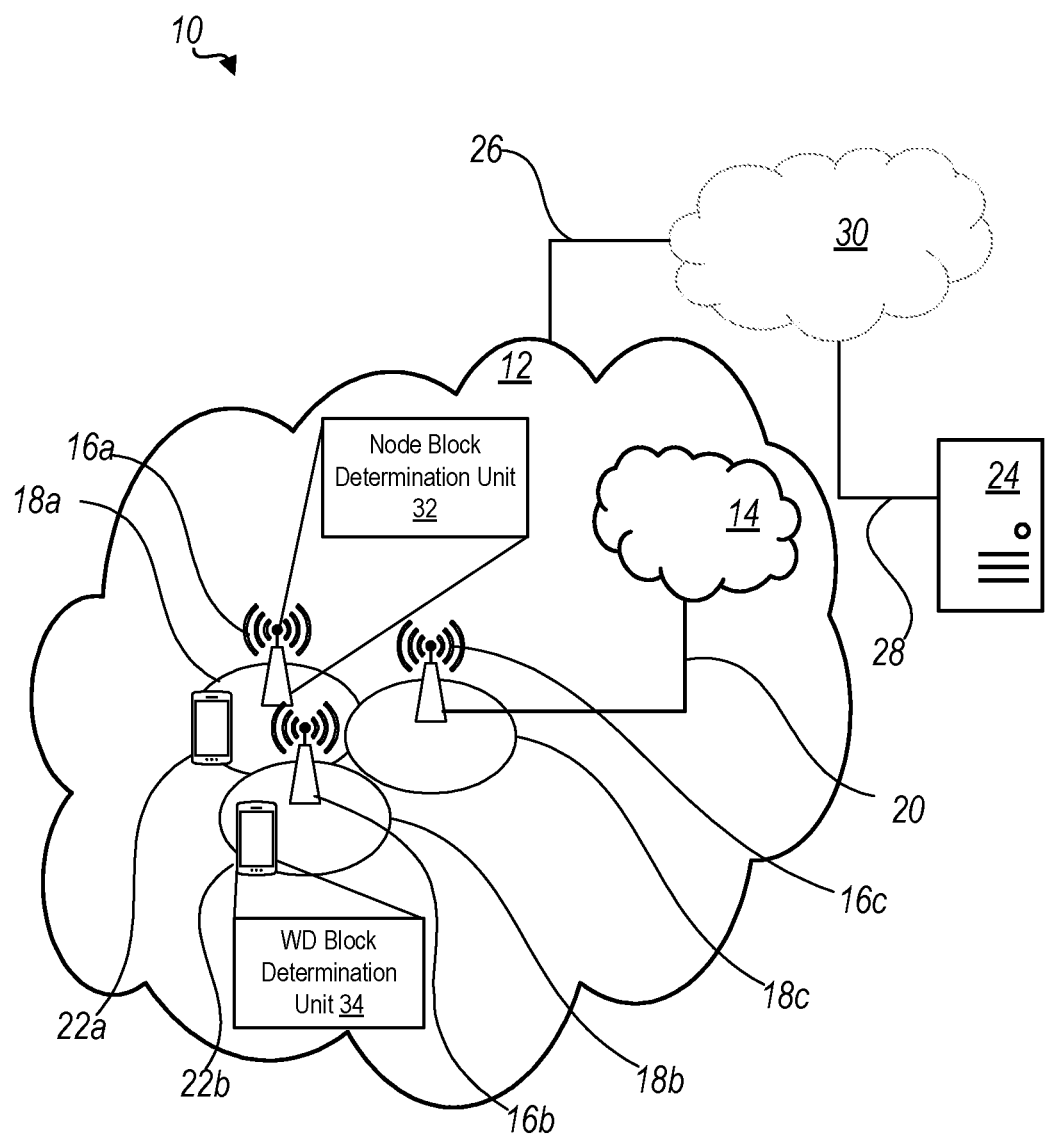
FIG. 8 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 8 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 8 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a network node block determination unit 32 which is configured to construct a single transport block for transmission over a time duration that exceeds a single time slot. A wireless device 22 is configured to include a WD block determination unit 34 which is configured to construct a single transport block for transmission over a time duration that exceeds a single time slot.

Example implementations, in accordance with an embodiment, of the WD 22, network node 16 and host computer 24 discussed in the preceding paragraphs will now be described with reference to FIG. 9. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include network node block determination unit 32 configured to construct a single transport block for transmission over a time duration that exceeds a single time slot.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a WD block determination unit 34 configured to construct a single transport block for transmission over a time duration that exceeds a single time slot. In some embodiments, the inner workings of the network node 16, WD 22, and host computer 24 may be as shown in FIG. 9 and independently, the surrounding network topology may be that of FIG. 8.

Figure 9:
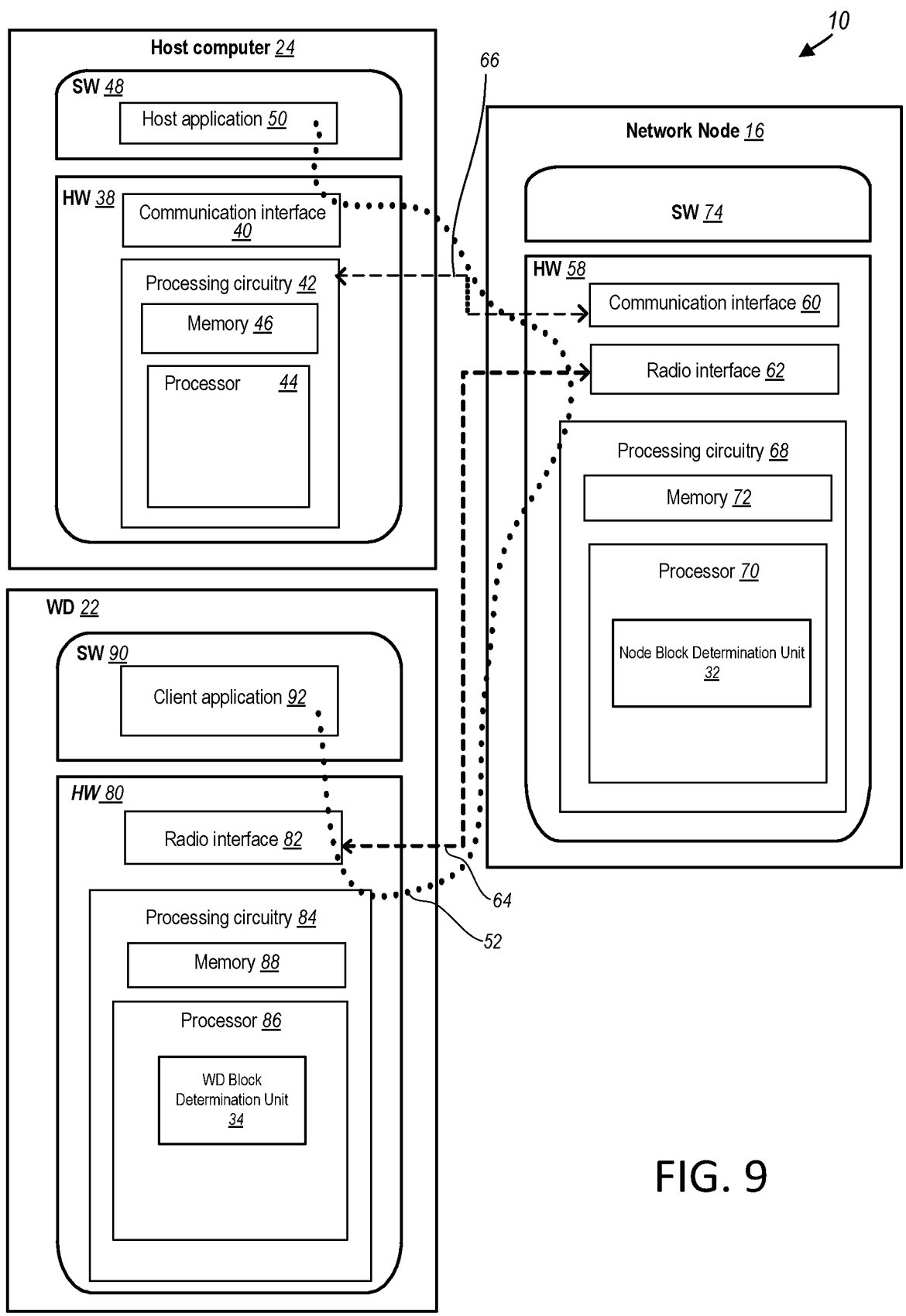
FIG. 9 is a block diagram of a host computer communicating via a network node with a wireless device over an at least partially wireless connection according to some embodiments of the present disclosure.

In FIG. 9, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 8 and 9 show various "units" such as network node block determination unit 32, and WD block determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 10, 11:
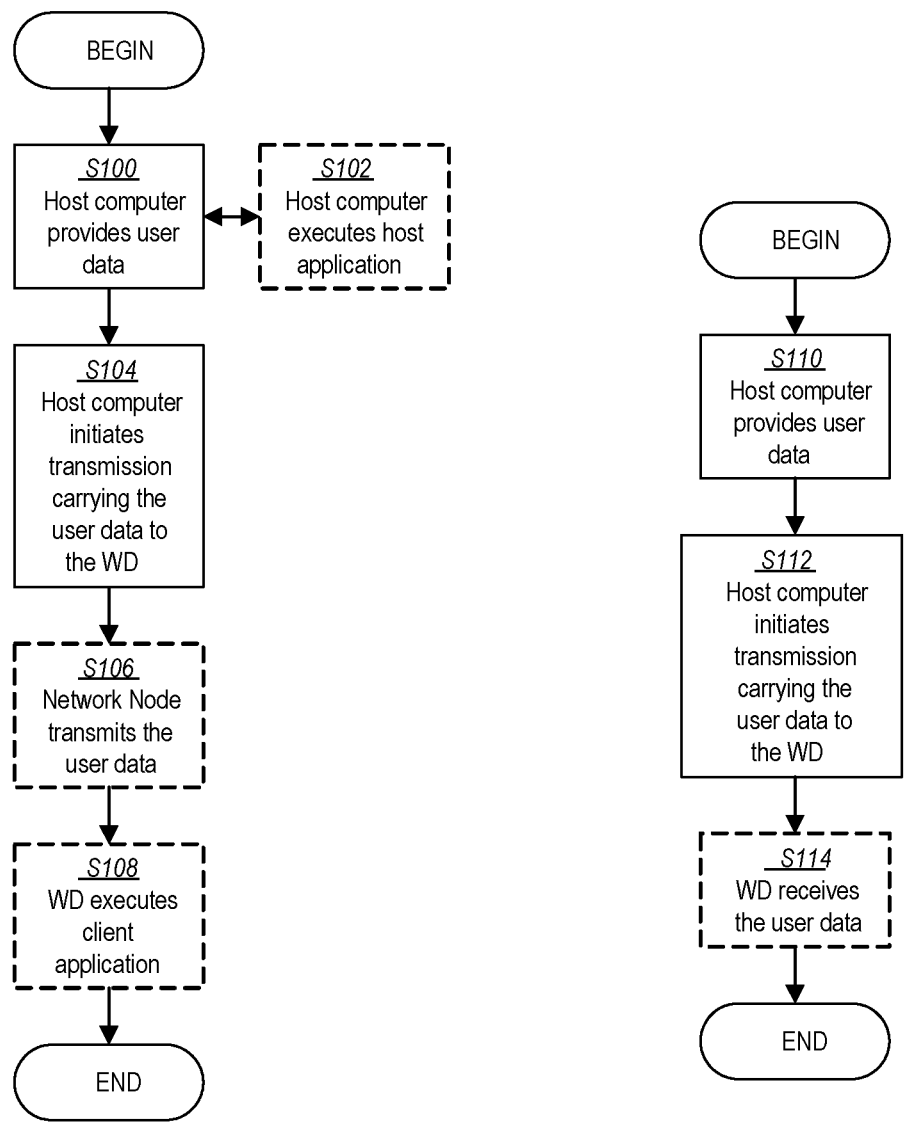
FIG. 10 is a flowchart illustrating exemplary methods implemented in a communication system including a host computer, a network node and a wireless device for executing a client application at a wireless device according to some embodiments of the present disclosure.
FIG. 11 is a flowchart illustrating exemplary methods implemented in a communication system including a host computer, a network node and a wireless device for receiving user data at a wireless device according to some embodiments of the present disclosure.

FIG. 10 is a flowchart illustrating an exemplary method implemented in a communication system, such as, for example, the communication system of FIGS. 8 and 9, in accordance with one embodiment. The communication system may include a host computer 24, a network node 16 and a WD 22, which may be those described with reference to FIG. 9. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 11 is a flowchart illustrating an exemplary method implemented in a communication system, such as, for example, the communication system of FIG. 8, in accordance with one embodiment. The communication system may include a host computer 24, a network node 16 and a WD 22, which may be those described with reference to FIGS. 8 and 9. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 12 is a flowchart illustrating an exemplary method implemented in a communication system, such as, for example, the communication system of FIG. 8, in accordance with one embodiment. The communication system may include a host computer 24, a network node 16 and a WD 22, which may be those described with reference to FIGS. 8 and 9. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 13 is a flowchart illustrating an exemplary method implemented in a communication system, such as, for example, the communication system of FIG. 8, in accordance with one embodiment. The communication system may include a host computer 24, a network node 16 and a WD 22, which may be those described with reference to FIGS. 8 and 9. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 14:
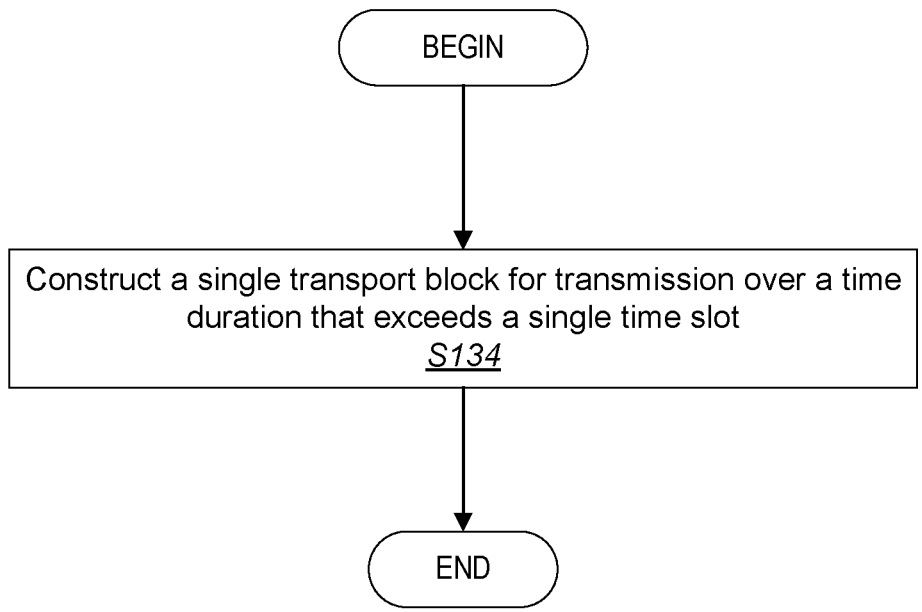
FIG. 14 is a flowchart of an exemplary process in a network node for constructing a single transport block for transmission over a time duration that exceeds a single time slot according to some embodiments of the present disclosure.

FIG. 14 is a flowchart of an exemplary process in a network node 16 for constructing a single transport block for transmission over a time duration that can exceed a single slot. One or more Blocks and/or functions performed by network node 16 may be performed by one or more elements of network node 16 such as by network node block determination unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to construct (Block S134) a single transport block for transmission over a time duration that exceeds a single time slot.

In one or more embodiments, the single transport block is scheduled over at least two time slots and a number of scheduled orthogonal frequency-division multiplexing (OFDM) symbols in at the at least two time slots is not equal. In one or more embodiments, the transmission is one of a Physical Uplink Shared Channel (PUSCH) or Physical Downlink Shared Channel (PDSCH) transmission.

In one or more embodiments, the network node 16, such as via one or more of processing circuitry 68, processor 70, radio interface 62 and communication interface 60, is configured to channel encode and rate match code blocks to as equal a number of coded bits as possible. In one or more embodiments, the network node 16, such as via one or more of processing circuitry 68, processor 70, radio interface 62 and communication interface 60, is configured to determine a number of code blocks in a code block set using at least one of a round, ceil, or floor function. In one or more embodiments, the network node 16, such as via one or more of processing circuitry 68, processor 70, radio interface 62 and communication interface 60, is configured to restrict encoded bits of a low density parity check (LDPC) codeword to a single time slot. In one or more embodiments, the network node 16, such as via one or more of processing circuitry 68, processor 70, radio interface 62 and communication interface 60, is configured to perform code block segmentation. In one or more embodiments, the network node 16, such as via one or more of processing circuitry 68, processor 70, radio interface 62 and communication interface 60, is configured to determine a number of information bits for a time slot using at least one of a code rate, modulation order, and number of spatial multiplexing layers. In one or more embodiments, the network node 16, such as via one or more of processing circuitry 68, processor 70, radio interface 62 and communication interface 60, is configured to determine a number of resource elements using at least one of a number of scheduled OFDM symbols in the time domain and a number of allocated primary resource blocks (PRBs) in the frequency domain.

Figure 15:
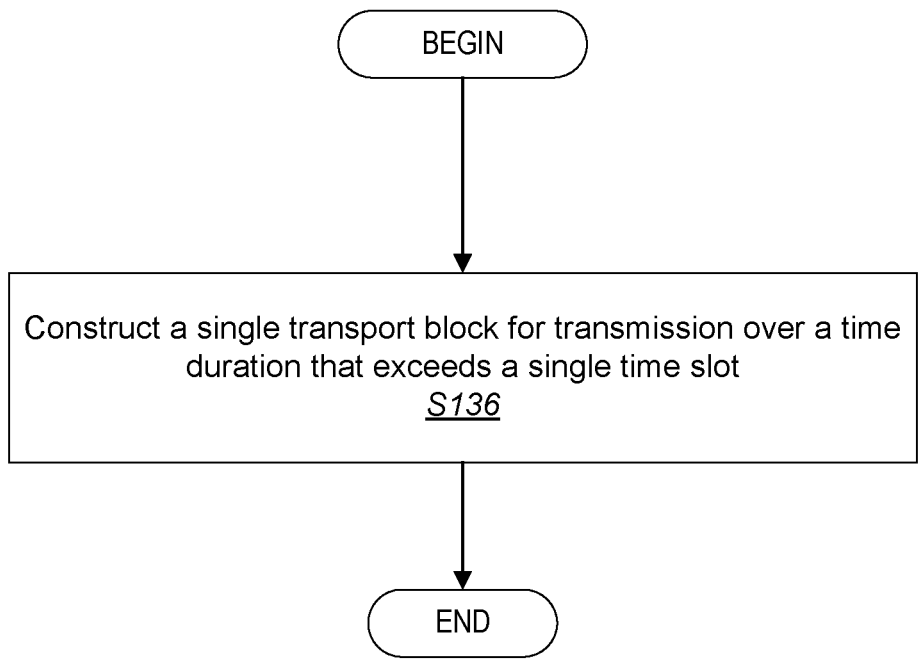
FIG. 15 is a flowchart of an exemplary process in a wireless device for constructing a single transport block for transmission over a time duration that exceeds a single time slot according to some embodiments of the present disclosure.

FIG. 15 is a flowchart of an exemplary process in a wireless device 22 according to some embodiments of the present disclosure construct a single transport block for transmission over a time duration that exceeds a single time slot. One or more Blocks and/or functions performed by wireless device 22 may be performed by one or more elements of wireless device 22 such as by WD block determination unit 34 in processing circuitry 84, processor 86, radio interface 82, etc. In one or more embodiments, wireless device 22 such as via one or more of processing circuitry 84, processor 86 and radio interface 82 is configured to construct (Block S136) a single transport block for transmission over a time duration that exceeds a single time slot.

In one or more embodiments, the single transport block is scheduled over at least two time slots and a number of scheduled orthogonal frequency-division multiplexing (OFDM) symbols in at the at least two time slots is not equal. In one or more embodiments, the transmission is one of a Physical Uplink Shared Channel (PUSCH) or Physical Downlink Shared Channel (PDSCH) transmission. In one or more embodiments, WD 22 such as via one or more of processing circuitry 84, processor 86 and radio interface 82, is configured to channel encode and rate match code blocks to as equal a number of coded bits as possible. In one or more embodiments, WD 22 such as via one or more of processing circuitry 84, processor 86 and radio interface 82, is configured to determine a number of code blocks in a code block set using at least one of a round, ceil, or floor function. In one or more embodiments, WD 22 such as via one or more of processing circuitry 84, processor 86 and radio interface 82, is configured to restrict encoded bits of a low density parity check (LDPC) codeword to a single time slot. In one or more embodiments, WD 22 such as via one or more of processing circuitry 84, processor 86 and radio interface 82, is configured to perform code block segmentation. In one or more embodiments, WD 22 such as via one or more of processing circuitry 84, processor 86 and radio interface 82, is configured to determine a number of information bits for a time slot using at least one of a code rate, modulation order, and number of spatial multiplexing layers. In one or more embodiments, WD 22 such as via one or more of processing circuitry 84, processor 86 and radio interface 82, is configured to determine a number of resource elements using at least one of a number of scheduled OFDM symbols in the time domain and a number of allocated primary resource blocks (PRBs) in the frequency domain.

FIG. 16 is a flowchart of an exemplary process in a network node 16 for constructing a single transport block for transmission over a time duration that can exceed a single slot. One or more Blocks and/or functions performed by network node 16 may be performed by one or more elements of network node 16 such as by network node block determination unit 32 in processing circuitry 68, processor 70, communication interface 60, radio interface 62, etc. In one or more embodiments, a method implemented by a radio node is provided. The method includes determining (Block S138), such as by network node block determination unit 32, processing circuitry 68, processor 70, communication interface 60 and/or radio interface 62, a transport block, TB, size based at least in part on a number of resource elements in a plurality of time slots. The method includes determining (Block S140), such as by network node block determination unit 32, processing circuitry 68, processor 70, communication interface 60 and/or radio interface 62, a segmentation of a transport block, TB, having the TB size, the segmentation producing a plurality of segmented CBs. The method includes determining (Block S142), such as by network node block determination unit 32, processing circuitry 68, processor 70, communication interface 60 and/or radio interface 62, a channel coding for each of the plurality of segmented CBs, the channel coding producing a plurality of coded CBs. The method includes one of transmitting and receiving (Block S144), such as by network node block determination unit 32, processing circuitry 68, processor 70, communication interface 60 and/or radio interface 62, the plurality of coded CBs over the plurality of time slots according to the determined segmentation and the determined channel coding.

In some embodiments, the radio node is a wireless device, WD, and wherein the transmission of the plurality of coded CBs is on a Physical Uplink Shared Channel, PUSCH, scheduled over the plurality of time slots and the reception of the plurality of coded CBs is on a Physical Downlink Shared Channel, PDSCH, scheduled over the plurality of time slots. In some embodiments, the radio node is a radio network node and wherein the transmission of the plurality of coded CBs on a Physical Downlink Shared Channel, PDSCH, scheduled over the plurality of time slots and the reception of the plurality of coded CBs is on a Physical Uplink Shared Channel, PUSCH, scheduled over the plurality of time slots. In some embodiments, a number of orthogonal frequency-division multiplexing, OFDM, symbols that are scheduled in one of the plurality of time slots is not equal to a number of OFDM symbols that are scheduled in a number of OFDM symbols that are scheduled in at least one other of the plurality of time slots. In some embodiments, determining the TB size comprises determining, such as by network node block determination unit 32, processing circuitry 68, processor 70, communication interface 60 and/or radio interface 62, the number of resource elements in the plurality of time slots as a sum of a number of resource elements scheduled in each of the plurality of time slots.

In some embodiments, determining the TB size comprises determining, such as by network node block determination unit 32, processing circuitry 68, processor 70, communication interface 60 and/or radio interface 62, the number of resource elements in the plurality of time slots using an average of the number of orthogonal frequency division multiplexing, OFDM, symbols scheduled in each of the plurality of time slots. In some embodiments, the method further includes when the TB is scheduled over more than one time slot: determining, such as by network node block determination unit 32, processing circuitry 68, processor 70, communication interface 60 and/or radio interface 62, a TB cyclic redundancy check, CRC, the TB CRC being appended to the TB prior to the segmentation that produces the plurality of segmented CBs.

In some embodiments, each of the produced plurality of segmented CBs are equally sized; and the method further comprising determining, such as by network node block determination unit 32, processing circuitry 68, processor 70, communication interface 60 and/or radio interface 62, a rate matching of the produced plurality of coded CBs, the rate matching producing an equal number of coded bits per coded CB. In some embodiments, at least one of the plurality of coded CBs crosses a time slot boundary. In some embodiments, the method further comprises restricting, such as by network node block determination unit 32, processing circuitry 68, processor 70, communication interface 60 and/or radio interface 62, coded bits of a low density parity check, LDPC, codeword to one time slot, the LDPC codeword comprising at least one of the plurality of coded CBs. In some embodiments, the produced plurality of segmented CBs are equally sized; and the method further includes determining, such as by network node block determination unit 32, processing circuitry 68, processor 70, communication interface 60 and/or radio interface 62, a rate matching of the plurality of coded CBs, the rate matching producing an unequal number of coded bits per coded CB in at least two coded CBs of the plurality of coded CBs, each coded CB being restricted to one time slot.

In some embodiments, when at least two coded CBs of the plurality of coded CBs are within a same time slot, the method further comprises, such as by network node block determination unit 32, processing circuitry 68, processor 70, communication interface 60 and/or radio interface 62, determining that the at least two coded CBs in the same time slot are rate matched into an equal number of coded bits per coded CB in the same time slot: and the at least two coded CBs having an unequal number of coded bits per coded CB are in different time slots. In some embodiments, the plurality of coded CBs are produced according to a division of a total number of the CBs scheduled for the one of the transmission and the reception into a plurality of CB sets, each CB set being transmitted within a respective time slot of the plurality of time slots. In some embodiments, a number of CBs in an i-th CB set is based at least in part on a number of orthogonal frequency-division multiplexing, OFDM, symbols that are scheduled in a time slot i of the plurality of time slots.

In some embodiments, the number of CBs in the i-th CB set are determined using at least one of a rounding function, a ceiling function and a floor function. In some embodiments, the produced plurality of segmented CBs are unequally sized; and the method further comprises determining, such as by network node block determination unit 32, processing circuitry 68, processor 70, communication interface 60 and/or radio interface 62, a rate matching of the plurality of coded CBs, the rate matching producing an unequal number of coded bits per coded CB in at least two of the plurality of coded CBs, each coded CB being restricted to one time slot.

In some embodiments, when at least two coded CBs of the plurality of coded CBs are within a same time slot, the method further comprises determining, such as by network node block determination unit 32, processing circuitry 68, processor 70, communication interface 60 and/or radio interface 62, that the at least two coded CBs in the same time slot are rate matched into an equal number of coded bits per coded CB in the same time slot: and the at least two coded CBs having an unequal number of coded bits per coded CB are in different time slots. In some embodiments, when the TB is scheduled over more than one time slot: the segmentation of the TB to produce the plurality of segmented CBs is regardless of the TB size; and a TB cyclic redundancy check, CRC, checksum size is 24 bits regardless of the TB size.

In some embodiments, when the TB is scheduled over more than one time slot: determining, such as by network node block determination unit 32, processing circuitry 68, processor 70, communication interface 60 and/or radio interface 62, that a cyclic redundancy check, CRC, is not appended to the TB; and the segmentation of the TB to produce the plurality of segmented CBs is regardless of the TB size, the TB on which the segmentation is performed lacking a TB cyclic redundancy check, CRC. In some embodiments, the produced plurality of segmented CBs are unequally sized; and when the TB is scheduled over more than one time slot: the method further comprises determining, such as by network node block determination unit 32, processing circuitry 68, processor 70, communication interface 60 and/or radio interface 62, a rate matching of the plurality of coded CBs, the rate matching producing an unequal number of coded bits per coded CB in at least two of the plurality of coded CBs, each coded CB being restricted to one time slot.

In some embodiments, when at least two coded CBs of the plurality of coded CBs are within a same time slot, the method further comprises determining, such as by network node block determination unit 32, processing circuitry 68, processor 70, communication interface 60 and/or radio interface 62, that the at least two coded CBs in the same time slot are rate matched into an equal number of coded bits per coded CB in the same time slot: and the at least two coded CBs having an unequal number of coded bits per coded CB are in different time slots. In some embodiments, when the TB is scheduled over more than one time slot: a CB cyclic redundancy check, CRC, checksum size is greater than 24 bits for each of the plurality of segmented CBs regardless of the TB size. In some embodiments, the CB CRC checksum size is one of 32 bits and 28 bits for each of the plurality of segmented CBs. In some embodiments, the method further includes determining, such as by network node block determination unit 32, processing circuitry 68, processor 70, communication interface 60 and/or radio interface 62, a number of CBs and an associated CB size for each time slot separately, the determination being based at least in part on a number of orthogonal frequency-division multiplexing, OFDM, symbols that are scheduled in the respective time slot.

FIG. 17 is a flowchart of an exemplary process in a wireless device 22 according to some embodiments of the present disclosure construct a single transport block for transmission over a time duration that exceeds a single time slot. One or more Blocks and/or functions performed by wireless device 22 may be performed by one or more elements of wireless device 22 such as by WD block determination unit 34 in processing circuitry 84, processor 86, radio interface 82, etc. In one or more embodiments, a method implemented by a radio node is provided. The method comprises determining (Block S146), such as by WD block determination unit 34, processing circuitry 84, processor 86 and/or radio interface 82, a transport block, TB, size based at least in part on a number of resource elements in a plurality of time slots. The method includes determining (Block S148), such as by WD block determination unit 34, processing circuitry 84, processor 86 and/or radio interface 82, a segmentation of a transport block, TB, having the TB size, the segmentation producing a plurality of segmented CBs. The method includes determining (Block S150), such as by WD block determination unit 34, processing circuitry 84, processor 86 and/or radio interface 82, a channel coding for each of the plurality of segmented CBs, the channel coding producing a plurality of coded CB s. The method includes one of transmitting and receiving (Block S152), such as by WD block determination unit 34, processing circuitry 84, processor 86 and/or radio interface 82, the plurality of coded CBs over the plurality of time slots according to the determined segmentation and the determined channel coding.

In some embodiments, the radio node is a wireless device, WD 22, and wherein the transmission of the plurality of coded CBs is on a Physical Uplink Shared Channel, PUSCH, scheduled over the plurality of time slots and the reception of the plurality of coded CBs is on a Physical Downlink Shared Channel, PDSCH, scheduled over the plurality of time slots. In some embodiments, the radio node is a radio network node 16 and wherein the transmission of the plurality of coded CBs on a Physical Downlink Shared Channel, PDSCH, scheduled over the plurality of time slots and the reception of the plurality of coded CBs is on a Physical Uplink Shared Channel, PUSCH, scheduled over the plurality of time slots.

In some embodiments, a number of orthogonal frequency-division multiplexing, OFDM, symbols that are scheduled in one of the plurality of time slots is not equal to a number of OFDM symbols that are scheduled in a number of OFDM symbols that are scheduled in at least one other of the plurality of time slots. In some embodiments, determining the TB size comprises determining, such as by WD block determination unit 34, processing circuitry 84, processor 86 and/or radio interface 82, the number of resource elements in the plurality of time slots as a sum of a number of resource elements scheduled in each of the plurality of time slots.

In some embodiments, determining the TB size comprises determining, such as by WD block determination unit 34, processing circuitry 84, processor 86 and/or radio interface 82, the number of resource elements in the plurality of time slots using an average of the number of orthogonal frequency division multiplexing, OFDM, symbols scheduled in each of the plurality of time slots. In some embodiments, the method further includes when the TB is scheduled over more than one time slot: determining, such as by WD block determination unit 34, processing circuitry 84, processor 86 and/or radio interface 82, a TB cyclic redundancy check, CRC, the TB CRC being appended to the TB prior to the segmentation that produces the plurality of segmented CBs.

In some embodiments, each of the produced plurality of segmented CBs are equally sized; and the method further comprising determining, such as by WD block determination unit 34, processing circuitry 84, processor 86 and/or radio interface 82, a rate matching of the produced plurality of coded CBs, the rate matching producing an equal number of coded bits per coded CB. In some embodiments, at least one of the plurality of coded CBs crosses a time slot boundary. In some embodiments, the method further comprises restricting, such as by WD block determination unit 34, processing circuitry 84, processor 86 and/or radio interface 82, coded bits of a low density parity check, LDPC, codeword to one time slot, the LDPC codeword comprising at least one of the plurality of coded CBs. In some embodiments, the produced plurality of segmented CBs are equally sized; and the method further includes determining, such as by WD block determination unit 34, processing circuitry 84, processor 86 and/or radio interface 82, a rate matching of the plurality of coded CBs, the rate matching producing an unequal number of coded bits per coded CB in at least two coded CBs of the plurality of coded CBs, each coded CB being restricted to one time slot.

In some embodiments, when at least two coded CBs of the plurality of coded CBs are within a same time slot, the method further comprises, such as by WD block determination unit 34, processing circuitry 84, processor 86 and/or radio interface 82, determining that the at least two coded CBs in the same time slot are rate matched into an equal number of coded bits per coded CB in the same time slot: and the at least two coded CBs having an unequal number of coded bits per coded CB are in different time slots. In some embodiments, the plurality of coded CBs are produced according to a division of a total number of the CBs scheduled for the one of the transmission and the reception into a plurality of CB sets, each CB set being transmitted within a respective time slot of the plurality of time slots. In some embodiments, a number of CBs in an i-th CB set is based at least in part on a number of orthogonal frequency-division multiplexing, OFDM, symbols that are scheduled in a time slot i of the plurality of time slots.

In some embodiments, the number of CBs in the i-th CB set are determined, such as by WD block determination unit 34, processing circuitry 84, processor 86 and/or radio interface 82, using at least one of a rounding function, a ceiling function and a floor function. In some embodiments, the produced plurality of segmented CBs are unequally sized; and the method further comprises determining, such as by WD block determination unit 34, processing circuitry 84, processor 86 and/or radio interface 82, a rate matching of the plurality of coded CBs, the rate matching producing an unequal number of coded bits per coded CB in at least two of the plurality of coded CBs, each coded CB being restricted to one time slot.

In some embodiments, when at least two coded CBs of the plurality of coded CBs are within a same time slot, the method further comprises determining, such as by WD block determination unit 34, processing circuitry 84, processor 86 and/or radio interface 82, that the at least two coded CBs in the same time slot are rate matched into an equal number of coded bits per coded CB in the same time slot: and the at least two coded CBs having an unequal number of coded bits per coded CB are in different time slots. In some embodiments, when the TB is scheduled over more than one time slot: the segmentation of the TB to produce the plurality of segmented CBs is regardless of the TB size; and a TB cyclic redundancy check, CRC, checksum size is 24 bits regardless of the TB size.

In some embodiments, when the TB is scheduled over more than one time slot: determining, such as by WD block determination unit 34, processing circuitry 84, processor 86 and/or radio interface 82, that a cyclic redundancy check, CRC, is not appended to the TB; and the segmentation of the TB to produce the plurality of segmented CBs is regardless of the TB size, the TB on which the segmentation is performed lacking a TB cyclic redundancy check, CRC. In some embodiments, the produced plurality of segmented CBs are unequally sized; and when the TB is scheduled over more than one time slot: the method further comprises determining, such as by WD block determination unit 34, processing circuitry 84, processor 86 and/or radio interface 82, a rate matching of the plurality of coded CBs, the rate matching producing an unequal number of coded bits per coded CB in at least two of the plurality of coded CBs, each coded CB being restricted to one time slot.

In some embodiments, when at least two coded CBs of the plurality of coded CBs are within a same time slot, the method further comprises determining, such as by WD block determination unit 34, processing circuitry 84, processor 86 and/or radio interface 82, that the at least two coded CBs in the same time slot are rate matched into an equal number of coded bits per coded CB in the same time slot: and the at least two coded CBs having an unequal number of coded bits per coded CB are in different time slots. In some embodiments, when the TB is scheduled over more than one time slot: a CB cyclic redundancy check, CRC, checksum size is greater than 24 bits for each of the plurality of segmented CBs regardless of the TB size. In some embodiments, the CB CRC checksum size is one of 32 bits and 28 bits for each of the plurality of segmented CBs. In some embodiments, the method further includes determining, such as by WD block determination unit 34, processing circuitry 84, processor 86 and/or radio interface 82, a number of CBs and an associated CB size for each time slot separately, the determination being based at least in part on a number of orthogonal frequency-division multiplexing, OFDM, symbols that are scheduled in the respective time slot.

Having described the general process flow of arrangements of the disclosure and having provided examples of hardware and software arrangements for implementing the processes and functions of the disclosure, the sections below provide details and examples of arrangements for providing a single transport block for transmission over a time duration that exceeds a single time slot, which may be performed by network node 16 and/or WD 22.

While some embodiments are described with examples in which one particular radio node (e.g., the WD 22) is a receiver and another particular radio node (e.g., network node 16) is the transmitter, or vice versa with the network node 16 as transmitter and WD 22 as receiver, it should be understood that the example arrangements are exemplary since it is well-known that each radio node may be a transmitter for one particular channel (e.g., PDSCH) and be a receiver for another channel (e.g., PUSCH).

In addition, where an example TB preparation, channel coding, rate matching and transmission procedure is described for a transmitting radio node, it should be apparent that that the receiving node may process the TB in a reverse manner to properly receive and decode the channel scheduled for the TB transmission.

A: Transport Block Preparation Embodiments For Flexible Hardware

For a transport block scheduled to span over B slots, the numbers of scheduled OFDM symbols in each slot, denoted by $N_{symb,i}^{sh}$ for i=0,1, ... , B−1, may be different. Stated another way, a number of OFDM symbols scheduled in one slot may not be not equal to a number of OFDM symbols scheduled in at least one other slot of the B slots over which the transport block is scheduled. This can be applicable for PUSCH and/or PDSCH transmissions.

Figure 18:
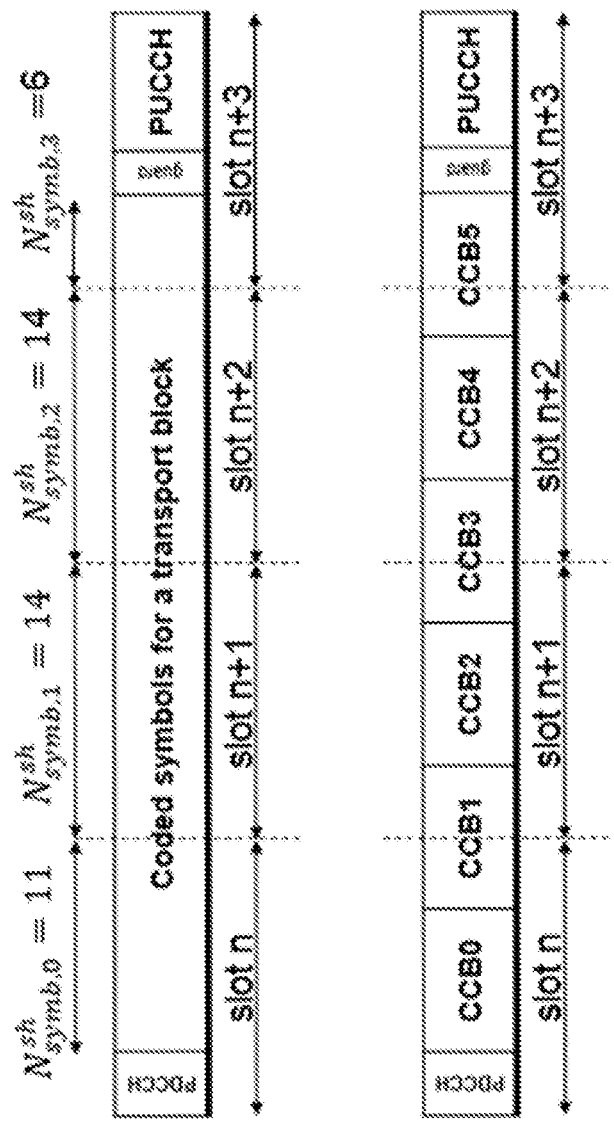
FIG. 18 is a schematic diagram of a transport block scheduled according to some embodiments of the present disclosure.

A nonlimiting example for a PDSCH scheduled over B=4 slots is illustrated in FIG. 18, where the number of scheduled OFDM symbols in each slot may be different as between at least two or more of the B slots. In the first slot, three OFDM symbols are used for the PDCCH and only $N_{symb,0}^{sh}=11$ OFDM symbols are scheduled for the PDSCH. In the second and third slots, 14 OFDM symbols are scheduled for the PDSCH. In the fourth slot, resources are reserved for PUCCH and guard time and only $N_{symb,3}^{sh}=6$ OFDM symbols are scheduled for the PDSCH. In general, the time domain resources allocated for the multi-slot PDSCH may not be contiguous and hence, as a nonlimiting example $N_{symb,1}^{sh}$ and $N_{symb,2}^{sh}$ may be less than 14.

A. 1: Example of Transport Block Size and Number of Code Blocks Determination for Flexible Hardware In a first embodiment, the WD 22 may first determine the number of REs over multiple scheduled slots as the sum of the number of REs for each of the multiple scheduled slots in Step 1 of the transport block size determination procedure. The WD 22 may then (even when the TB is scheduled over more than one time slot) follow the same or similar Step 2 to Step 4 in the transport block size determination procedure as described above, which may include determining a number, C', of code blocks as described above.

Step 1 Details: $N_{RE}=\Sigma_{i=0}^{B-1}n_{PRB}\cdot\min(156, N_{SC}^{RB}\cdot N_{symb,i}^{sh}-N_{DMRS}^{PRB}-N_{oh}^{PRB})$, where $N_{symb,i}^{sh}$, for $i=0,1,\ldots,B-1$, is the number of OFDM symbols scheduled in slot i within the B scheduled slots.

In a second embodiment, the WD 22 may first determine the number of REs over multiple scheduled slots using at least an average number of scheduled OFDM symbols in Step 1 of the transport block size determination procedure. The WD 22 may then (even when the TB is scheduled over more than one time slot) follow the same or similar Step 2 to Step 4 in the transport block size determination procedure described above, which may include determining a number, C', of code blocks as described above.

Step 1 Details: $N_{RE}=B\cdot n_{PRB}\cdot\min(156, N_{SC}^{RB}\cdot N_{symb,avg}^{sh}-N_{DMRS}^{PRB}-N_{oh}^{PRB})$, where $$N_{symb,avg}^{sh} = \frac{1}{B}\Sigma_{i=0}^{B-1} N_{symb,i}^{sh}$$

is the average number of scheduled OFDM symbols.

A.2: Example of Channel Coding and Rate matching of Code Blocks for Flexible Hardware In any of the above embodiments, the code blocks scheduled for transmission are channel coded (e.g., to produce a plurality of coded code blocks (CCBs)) and rate matched to as equal size as possible (e.g., rate matched to produce an equal or substantially equal number of coded bits in each of the plurality of CCBs and/or rate matched such that each of the plurality of CCBs are equally or substantially equally sized). The coded symbols for a code block segmented from the transport block may be present in more than one slot, i.e., may cross a slot boundary.

Figure 19:
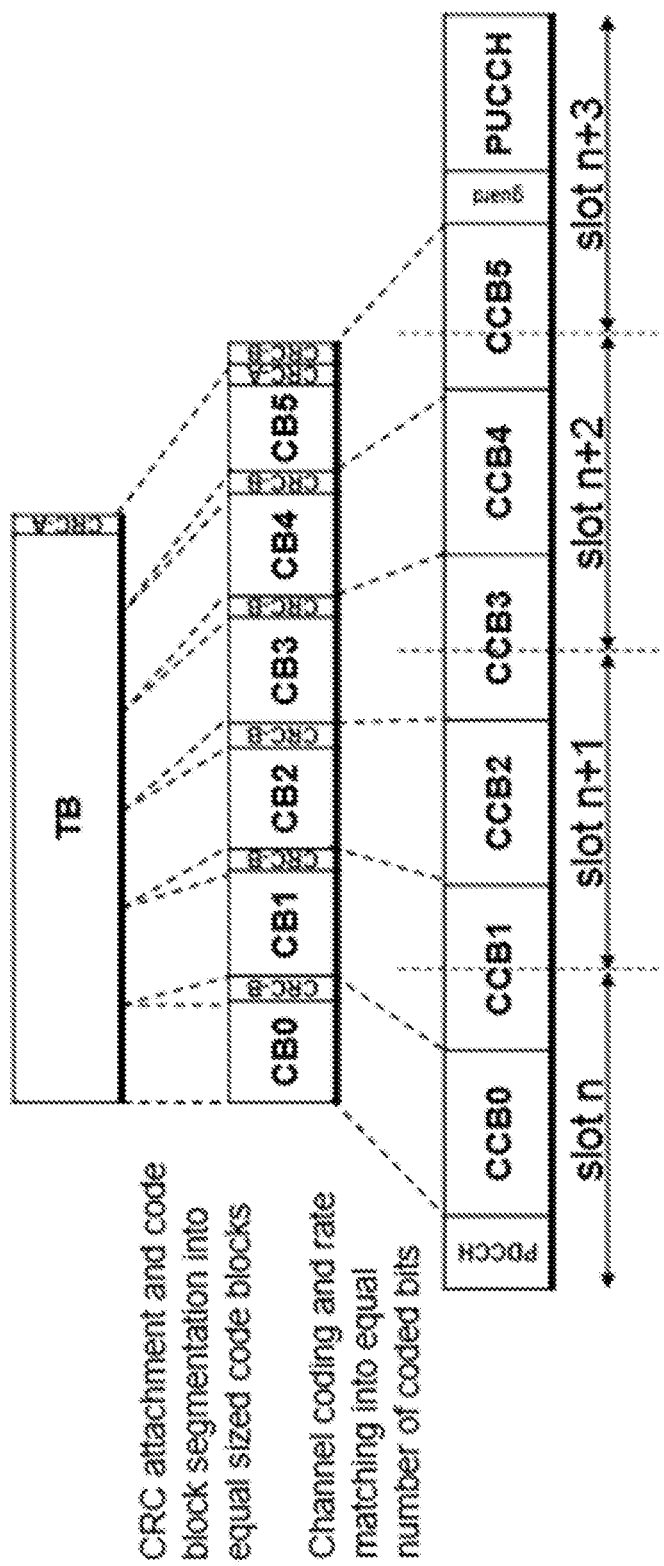
FIG. 19 is a schematic diagram of a method of multiplexing the coded symbols for six code blocks of a transport block according to some embodiments of the present disclosure.

A nonlimiting example for multiplexing the coded symbols for six code blocks of a transport block scheduled to span over B=4 slots is illustrated in FIG. 19. After transport block CRC attachment, code block segmentation may be performed to produce several segmented code blocks each of equal size. After code block CRC attachment, the code blocks are channel encoded (e.g., to produce a plurality of coded code blocks (CCBs)) and rate matched to as equal number of coded bits as possible (e.g., rate matched to produce an equal or substantially equal number of coded bits in each of the plurality of CCBs and/or rate matched such that each of the plurality of CCBs are equally or substantially equally sized). For example, it can be observed that in FIG. 19 coded symbols for code block 1, code block 3 and code block 5 are present in more than one slot. Stated another way, as can be visually seen in the example shown in FIG. 19, due at least in part to:

(i) the PDCCH taking up a portion of the first slot (slot n) over which the scheduled channel (e.g., PDSCH, PUSCH) corresponding to the TB transmission;

(ii) the PUCCH taking up a portion of the last slot (slot n+3) over which the scheduled channel (e.g., PDSCH, PUSCH) corresponding to the TB transmission is to be transmitted; and (ii) each of the plurality of CCBs corresponding to the TB transmission of the scheduled channel over the plurality of slots from slot n to slot n+3 being of equal size/equal number of coded bits;

each of code blocks 1, 3 and 5 ends up crossing a slot boundary. This may be acceptable for receiver hardware that is not restricted, i.e., receiver hardware that is able to receive a CCB, even if the CCB spans over two different slots.

Some example embodiments for restricted hardware are described below.

B: Embodiments of Code Block Rate Matching for Restricted Hardware

In practical receiver implementations (the WD 22 for the PDSCH and the network node 16 for the PUSCH), hardware design may have restriction such that certain unit of receiver processing cannot span over a slot boundary. As one nonlimiting example, the encoded bits of a LDPC code block may need to be restricted to within a single slot. The embodiments in this section related to the rate matching of the code blocks as determined as described herein.

B.1: Example of Determining a Nnumber of Code Blocks in each Slot

In a first embodiment, the total number of code blocks scheduled for transmission, denoted by C', are first divided in B sets of code blocks such that each set of the code blocks is to be transmitted within a slot scheduled for the transport block transmission.

According to a first teaching of the embodiment, the number of code blocks in the i-th code block set may be proportional to the number of scheduled OFDM symbols in slot i, denoted by for $N_{symb,i}^{sh}$ for $i=0,1,\ldots,B-1$.

As one nonlimiting embodiment, the number of code blocks in the i-th code block set may be determined using at least a round function on $C'\cdot N_{symb,i}^{sh}/N_{symb,total}^{sh}$, were $\Sigma_{symb,total}^{sh}=\Sigma_{i=0}^{B-1}N_{symb,i}^{sh}$ is the total number of number of scheduled OFDM symbols over the B slots.

As another nonlimiting embodiment, the number of code blocks in the i-th code block set may be determined using at least a ceil function on $C'\cdot N_{symb,i}^{sh}/N_{symb,total}^{sh}$.

As a further nonlimiting embodiment, the number of code blocks in the i-th code block set may be determined using at least a floor function on $C'\cdot N_{symb,i}^{sh}/N_{symb,total}^{sh}$.

The use of round, ceil, or floor function depends on the sorted order of $N_{symb,i}^{sh}$ amongst the list of $N_{symb,i}^{sh}$, for $i=0,1,\ldots,B-1$.

B.2: Example of Determining a Total Number of Coded Bits in each Code Block

According to a various embodiments, the total number of coded bits available for transmission in slot i may be divided as evenly as possible amongst the code blocks in the i-th code block set.

Let $G_i$ denote the total number of coded bits available for transmission of the transport block in slot i and $C_i'$ denote the number of code blocks assigned to the i-th code block set for slot i. A first set of code blocks in the code block set i are rate matched to $$\left\lfloor \frac{G_i}{C_i' \cdot Q_m \cdot v} \right\rfloor \cdot Q_m \cdot v$$

bits each.

A second set of code blocks in the code block set i are rate matched to $$\left\lceil \frac{G_i}{C_i' \cdot Q_m \cdot v} \right\rceil \cdot Q_m \cdot v$$

bits each.

Figure 20:
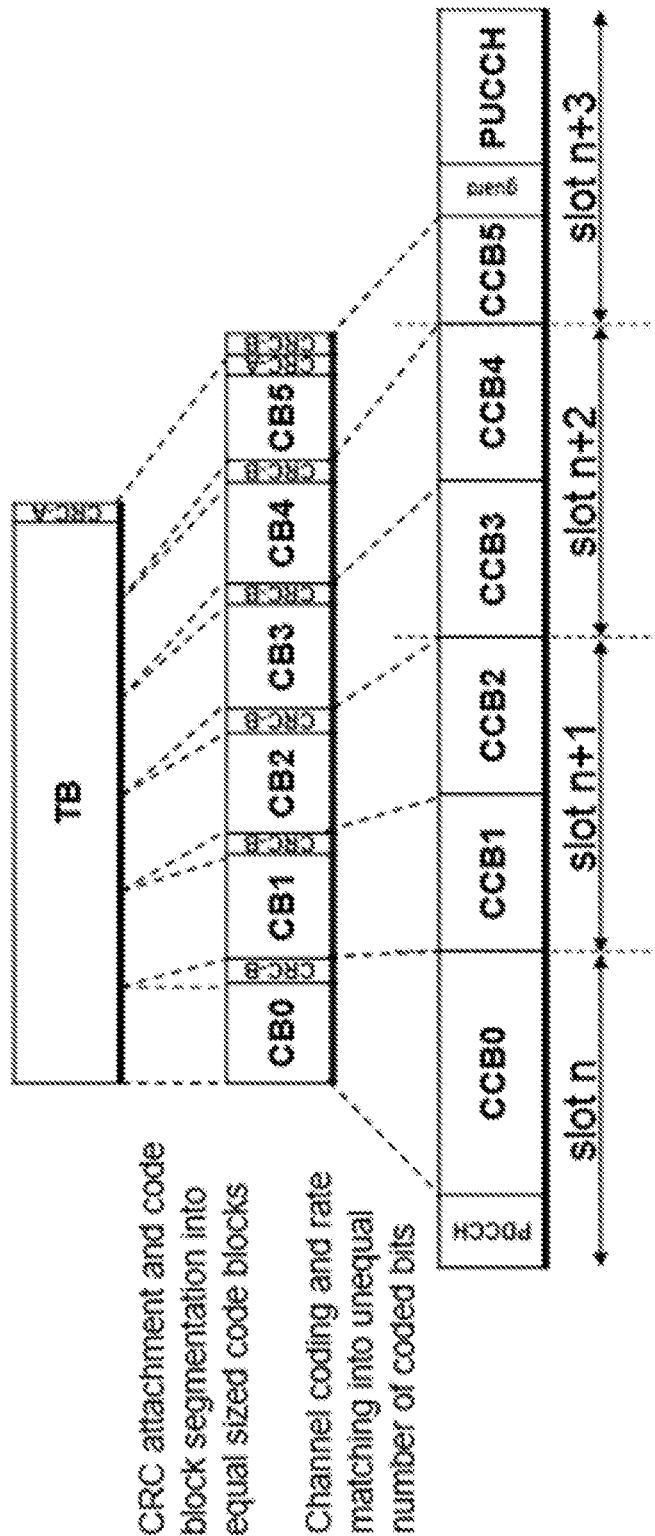
FIG. 20 is a schematic diagram of another method of multiplexing the coded symbols for six code blocks of a transport block according to some embodiments of the present disclosure.

A nonlimiting example is illustrated in FIG. 20. After transport block CRC attachment, code block segmentation is performed to produce several code blocks of equal size. After code block CRC attachment (i.e., appending a CRC to each code block), the code blocks are channel encoded and rate matched to an unequal number of coded bits as between at least two of the produced coded code blocks and such that the coded symbols of each coded code block are restricted to one slot. Stated another way, in some embodiments, the code blocks are channel encoded and rate matched into an unequal number of coded bits as between at least two coded code blocks (i.e., a number of coded bits, a, in one code block within a slot is not equal to a number of coded bits, b, in at least one other code block in at least one other slot of the produced code blocks). See in FIG. 20 e.g., CCB0 in slot n and CCB1 in slot n+1 as being unequal in size.

If two or more code blocks belong to a same slot (e.g., slots n+1 and n+2 in FIG. 20 each have 2 code blocks), the code blocks transmitted within a same slot are rate matched to as equal sizes as possible. For example, for each code block belonging to the same time slot (see e.g., coded code blocks (CCBs) 1 and 2 in slot n+1 of FIG. 20), there may be an equal number of coded bits per CCB (e.g., CCB1 and CCB2 belonging in slot n+1 both have the same number of coded bits); even though there may be one or more CCBs (e.g., CCB0 and/or CCB5) having a number of coded bits that is not equal to a number of coded bits in one or more other CCBs (e.g., CCBs 1-4). However, the effective code rates for code blocks transmitted in different scheduled slots may not be equal to one another, e.g., code rate for CCB0 in slot n may be different from code rate for CCB1 and CCB2 in slot n+1 of FIG. 20.

B.3: Example of Determining a Number of Code Blocks in each Slot

As a non-limiting example, the code blocks (CBs) are divided among the scheduled slots according to the following procedure:

Assuming there is at least one CB per slot.

$$C'' = C' - \sum_{i=0}^{i=B-1} \max\left(\text{floor}\left(C' \cdot N_{symb,i}^{sh} / N_{symb,total}^{sh}\right), 1\right).$$

The code block sets i=0, ... B−1 are ranked in the descending order of $K_i$, where $K_i$ donate $\text{mod}(N_{symb,i}^{sh}, \text{ceil}(N_{symb,total}^{sh}/C'))$, and j is the index in the sorted list.

$K_i = 0$ for $N_{symb,i}^{sh} < \text{ceil}(N_{symb,total}^{sh}/C')$ for j=0,1, ... C''−1, the number of code blocks in the i-th code block set corresponding to $K_j(j)$ is determined as ceil function on $C' \cdot N_{symb,i}^{sh}/N_{symb,total}^{sh}$.

For remaining code block sets, the number of code blocks in the i-th code block set is determined as $\max(1, \text{floor}(C' \cdot N_{symb,i}^{sh}/N_{symb,total}^{sh}))$.

C: Transport Block Preparation Embodiments for Restricted Hardware

In practical receiver implementations (for example the WD 22 for the PDSCH and the network node 16 for the PUSCH), hardware design may have restrictions such that certain units of receiver processing may not span over a slot boundary. As one nonlimiting example, the encoded bits of a LDPC code block may need to be restricted to within a single slot. The embodiments in this section deal with any of these processing unit restriction issues.

According to various embodiments, code block segmentation may be performed when a transport block is scheduled to be transmitted over more than one slot regardless of the size of the transport block size. Each slot contains at least one code block.

According to various embodiments, the transport block CRC checksum size may be always set to 24 when a transport block is scheduled to be transmitted over more than one slot regardless of the size of the transport block size.

In a nonlimiting exemplary embodiment, the number of code blocks and the associated code block size for each slot scheduled for a transport block transmission may be determined separately based on at least the numbers of scheduled OFDM symbols in each slot. The total number of coded bits available for transmission in each slot may be divided as evenly as possible amongst the code blocks determined by each slot. The code block sizes for different slots scheduled for a transport block transmission may be different. The procedure is described in the following.

For slot i=0, 1, ... B−1, perform the following steps.

Step 1

The WD 22 may first determine the number of REs, denoted by $N_{RE,i}$, within the scheduled slot i using the number of scheduled OFDM symbols in the time domain, the number allocated PRBs in the frequency domain, and other higher layer configured parameters.

Step 2

The WD 22 may further determine the intermediate number of information bits for slot i, denoted by $N_{info,i}$, using the code rate, the modulation order, and the number of spatial multiplexing layers.

If the slot is not the last slot (that is, i<B−1), there are no transport block CRC checksum bits to be accounted in the determination of the code block size.

If $N_{info,i}$ is no greater than 3816, Step 3 is performed. There is only one code block for slot i.

If $N_{info,i}$ is greater than 3816, Step 4 is performed. If the code rate is no greater than ¼ or if $N_{info,i}$ is greater than 8424, code block segmentation is performed for slot i. Otherwise, there is only one code block for slot i.

If the slot is the last slot (that is, i=B−1), the overhead for the transport block CRC checksum needs to be accounted in the determination of the code block size.

If $N_{info,i}$ is not greater than 3792, Step 3' is performed. There is only one code block for slot i.

If $N_{info,i}$ is greater than 3792, Step 4' is performed. If the code rate is no greater than ¼ or if $N_{info,i}$ is greater than 8400, code block segmentation is performed for slot i. Otherwise, there is only one code block for slot i.

Further details of the above steps are explained in the following.

Step 1 Details: $N_{RE,i}=n_{PRB} \cdot \min(156, N_{SC}^{RB} \cdot N_{symb,i}^{sh} - N_{DMRS}^{PRB} - N_{oh}^{PRB})$, where $N_{SC}^{RB}=12$ is the number of subcarriers in a PRB, $N_{symb,i}^{sh}$ is the numbers of scheduled OFDM symbols in slot i, $N_{DMRS}^{PRB}$ is the number of REs for DM-RS per PRB in the scheduled slot i including the overhead of the DM-RS CDM groups without data, and $N_{oh}^{PRB}$ is the overhead per PRB configured by higher layer signaling.

Step 2 Details: $N_{iinfo,i}=N_{RE,i} \cdot R \cdot Q_m \cdot v$.

If the slot is not the last slot (that is, i<B−1), there are no transport block CRC checksum bits to be accounted in the determination of the code block size.

Step 3 details: If $N_{info,i}$ is no greater than 3816, there is only one code block for slot i. The code block size is determined from the smallest LDPC codeword length listed in Table 1

Table that can contain both the $N_{info,i}$ bits and the 24 code block CRC checksum bits.

The intermediate number of information bits is first quantized to $$N'_{info,i} = \max\left(24, 2^n \cdot \left\lfloor \frac{N_{info,i}}{2^n} \right\rfloor \right),$$

where n is determined as $\max(3, \lfloor \log_2 N_{info,i} \rfloor - 6)$. The smallest codeword length, denoted by $L_{CW}$, listed in Table 1 that is no less than $N_{info,i}'+24$ is selected and the code block size is set to $CBS_i=L_{CW}-24$.

Step 4 details: If $N_{info,i}$ is greater than 3816,

If the code rate is no greater than ¼ or if $N_{info,i}$ is greater than 8424, code block segmentation is performed for slot i. Otherwise, there is only one code block for slot i.

When the code rate is no greater than ¼, LDPC codeword lengths up to 3840 bits are used for the code blocks. When $N_{info,i}$ is greater than 8424, LDPC codeword lengths up to 8448 bits are used for the code blocks.

The intermediate number of information bits is first quantized to $$N'_{info,i} = \max\left(3840, 2^n \cdot \text{round}\left(\frac{N_{info,i}}{2^n}\right)\right),$$

where n is determined as $\lfloor \log_2(N_{info,i}) \rfloor - 5$. The code block size is determined as $$CBS_i = 8 \cdot \left\lceil \frac{N'_{info,i}}{8C_i} \right\rceil,$$

where the number of code blocks for slot i, denoted by $C_i$, is determined as follows.

If code rate $R \leq ¼$, the number of code blocks is determined as $$C_i = \left\lceil \frac{N'_{info}}{3816} \right\rceil.$$

Otherwise, the number of code blocks is determined as $$C_i = \left\lceil \frac{N'_{info}}{8424} \right\rceil.$$

If the slot is the last slot (that is, i=B−1), the overhead for the transport block CRC checksum needs to be accounted in the determination of the code block size.

Step 3' details: If $N_{info,i}$ is no greater than 3792, there is only one code block for slot i. The code block size is determined from the smallest LDPC codeword length listed in Table 1 that can contain both the $N_{info,i}$ bits, the 24 transport block CRC checksum bits, and the 24 code block CRC checksum bits.

The intermediate number of information bits is first quantized to $$N'_{info,i} = \max\left(24, 2^n \cdot \left\lfloor \frac{N_{info,i}-24}{2^n} \right\rfloor \right),$$

where n is determined as $\max(3, \lceil \log_2 (N_{info,i}-24) \rceil - 6)$. The smallest codeword length, denoted by $L_{CW}$, listed in Table 1 Table that is no less than $N_{info,i}'+48$ is selected and the code block size is set to $CBS_i=L_{CW}-24$.

Step 4' details: If $N_{info,i}$ is greater than 3792,

If the code rate is no greater than ¼ or if $N_{info,i}$ is greater than 8400, code block segmentation is performed. Otherwise, there is only one code block for slot i.

When the code rate is no greater than ¼, LDPC codeword lengths up to 3840 bits are used for the code blocks. When $N_{info}$ is greater than 8400, LDPC codeword lengths up to 8448 bits are used for the code blocks.

The intermediate number of information bits for slot i is first quantized to $$N'_{info,i} = \max\left(3840, 2^n \cdot \text{round}\left(\frac{N_{info,i}-24}{2^n}\right)\right),$$

where n is determined as $\lfloor \log_2(N_{info,i}-24) \rfloor - 5$. The code block size is determined as $$CBS_i = 8 \cdot \left\lceil \frac{N'_{info,i}+24}{8C_i} \right\rceil,$$

where the number of code blocks for slot i, denoted by $C_i$, is determined as follows.

If code rate $R \leq ¼$, the number of code blocks is determined as $$C_i = \left\lceil \frac{N'_{info,i}+24}{3816} \right\rceil.$$

Otherwise, the number of code blocks is determined as $$C_i = \left\lceil \frac{N'_{info,i} + 24}{8424} \right\rceil.$$

Figure 21:
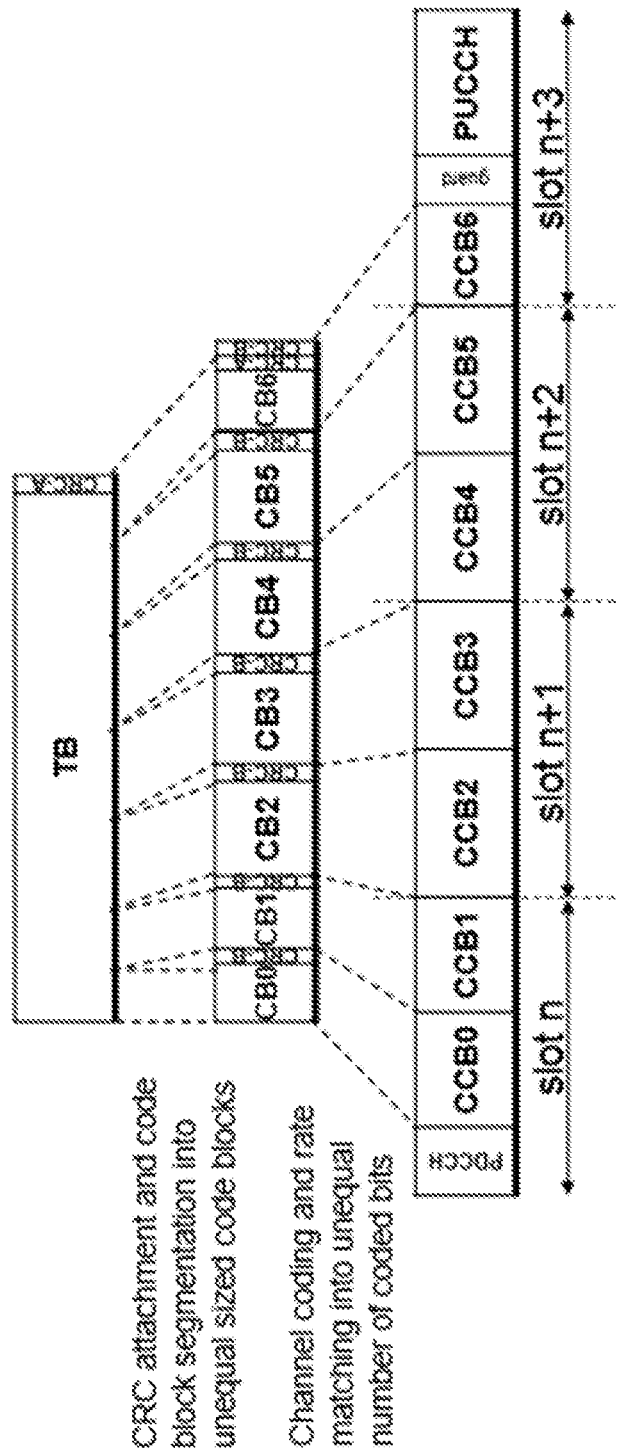
FIG. 21 is a schematic diagram of a method of determining the number of code blocks and multiplexing the coded symbols of a transport block according to some embodiments of the present disclosure.

A nonlimiting example is illustrated in FIG. 21. It can be observed that two code blocks are determined for the first scheduled slot based on the high number of scheduled resources in the first slot. The coded symbols of each code block are restricted to one slot. The sizes of the code blocks from different scheduled slots are not equal (e.g., segmented code blocks are unequally sized, i.e., at least two of the segmented code blocks, each of which are in different scheduled slots, are not of the same size). The sizes of code blocks from the same scheduled slot are equal (i.e., each code block belonging to the same scheduled time slot are of the same size). The code blocks transmitted within a slot are rate matched to as equal sizes as possible. The effective code rates for code blocks transmitted in different scheduled slots are roughly equal.

D: Enhanced CRC Attachment Embodiments for Restricted Hardware

This section provides arrangements to simplify the transport block preparation methods described herein.

According to various embodiments, code block segmentation is always performed and an alternative CRC checksum with better error detection capabilities is computed and attached to each code block when a transport block is scheduled to be transmitted over more than one slot regardless of the size of the transport block size. For the existing NR system specifications, a 24-bit CRC checksum is used for code block error detection. For the invention, as one nonlimiting exemplary embodiment, a 32-bit CRC checksum is used for code block error detection when a transport block is scheduled to be transmitted over more than one slot. As another nonlimiting exemplary embodiment, a 28-bit CRC checksum is used for code block error detection when a transport block is scheduled to be transmitted over more than one slot.

In various embodiments, a transport block CRC checksum may not be computed or attached to the transport block when a transport block is scheduled to be transmitted over more than one slot. Removing the transport block CRC computation and attachment can greatly simplify receiver implementation. The correctness of the received transport block is determined from the correctness of every received coded block.

With these two teachings, transport block preparation methods described herein may be greatly simplified as follows. The number of code blocks and the associated code block size for each slot scheduled for a transport block transmission is determined separately based on at least the numbers of scheduled OFDM symbols in each slot. The total number of coded bits available for transmission in each slot is divided as evenly as possible amongst the code blocks determined by each slot. The code block sizes for different slots scheduled for a transport block transmission may be different. There is no need of special handling for the last scheduled slot because there is no transport block CRC attachment.

An exemplary embodiment based on 32-bit code block CRC checksum attachment is presented below. It should be clear to one skilled in the art to practice the teaching using a different code block CRC checksum length.

For slot i=0, 1, . . . , B−1, perform the following steps.

Step 1

The WD 22 may first determine the number of REs, denoted by $N_{RE,i}$, within the scheduled slot i using the number of scheduled OFDM symbols in the time domain, the number allocated PRBs in the frequency domain, and other higher layer configured parameters.

Step 2

The WD 22 may further determine the intermediate number of information bits for slot i, denoted by $N_{info,i}$, using the code rate, the modulation order, and the number of spatial multiplexing layers.

Step3

If $N_{info,i}$ is no greater than 3808, There is only one code block for slot i.

Step 4

If $N_{info,i}$ is greater than 3808,

If the code rate is no greater than ¼ or if $N_{info,i}$ is greater than 8416, code block segmentation is performed for slot i. Otherwise, there is only one code block for slot i.

Further details of the above steps are explained in the following.

Step 1 Details: $N_{RE,i} = n_{PRB} \cdot \min(156, N_{symb,i}^{sh} - N_{DMRS}^{PRB} - N_{oh}^{PRB})$, where $N_{SC}^{RB} = 12$ is the number of subcarriers in a PRB, $N_{symb,i}^{sh}$ is the numbers of scheduled OFDM symbols in slot i, $N_{DMRS}^{PRB}$ is the number of REs for DM-RS per PRB in the scheduled slot i including the overhead of the DM-RS CDM groups without data, and $N_{oh}^{PRB}$ is the overhead per PRB configured by higher layer signaling.

Step 2 Details: $N_{info,i} = N_{RE,i} \cdot R \cdot Q_m \cdot v$.

Step 3 details: If $N_{info,i}$ is no greater than 3808, there is only one code block for slot i. The code block size is determined from the smallest LDPC codeword length listed in Table 1.

Table that can contain both the $N_{info,i}$ bits and the 32 code block CRC checksum bits.

The intermediate number of information bits is first quantized to $$N'_{info,i} = \max\left(24, 2^n \cdot \left\lfloor \frac{N_{info,i}}{2^n} \right\rfloor\right),$$

where n is determined as $\max(3, \lfloor \log_2 N_{info,i} \rfloor - 6)$. The smallest codeword length, denoted by $L_{CW}$, listed in Table 1 Table that is no less than $N'_{info,i} + 32$ is selected and the code block size is set to $CBS_i = L_{CW} - 32$.

Step 4 details:

If $N_{info,i}$ is greater than 3808,

If the code rate is no greater than ¼ or if $N_{info,i}$ is greater than 8416, code block segmentation is performed for slot i. Otherwise, there is only one code block for slot i.

When the code rate is no greater than ¼, LDPC codeword lengths up to 3840 bits is used for the code blocks. When $N_{info,i}$ is greater than 8416, LDPC codeword lengths up to 8448 bits is used for the code blocks.

The intermediate number of information bits is first quantized to $$N'_{info,i} = \max\left(3840, 2^n \cdot \text{round}\left(\frac{N_{info,i}}{2^n}\right)\right),$$

where n is determined as $\lfloor \log_2(N_{info,i}) \rfloor - 5$. The code block size is determined as $$CBS_i = 8 \cdot \left\lceil \frac{N'_{info,i}}{8C_i} \right\rceil,$$

where the number of code blocks for slot i, denoted by $C_i$, is determined as follows.

If code rate $R \leq \frac{1}{4}$, the number of code blocks is determined as $$C_i = \left\lceil \frac{N'_{info}}{3808} \right\rceil.$$

Otherwise, the number of code blocks is determined as $$C_i = \left\lceil \frac{N'_{info}}{8416} \right\rceil.$$

Figure 22:
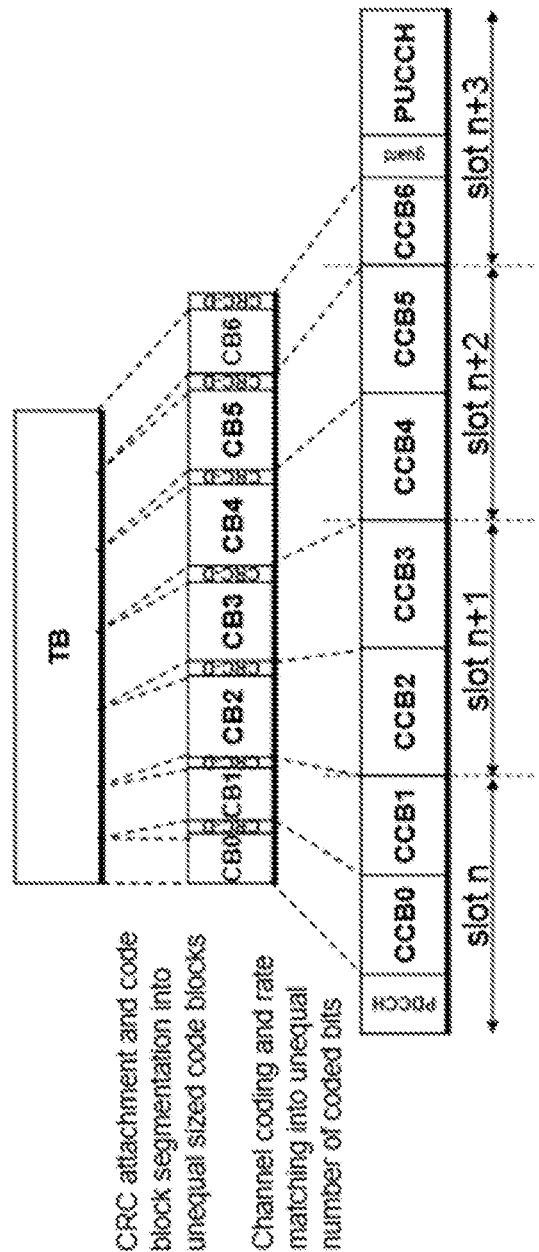
FIG. 22 is a schematic diagram of another method of determining the number of code blocks and multiplexing the coded symbols of a transport block according to some embodiments of the present disclosure.

A nonlimiting example is illustrated in FIG. 22. It can be observed that two code blocks are determined for the first scheduled slot based on the high number of scheduled resources in the first slot. The coded symbols of each code block are restricted to one slot. The sizes of the code blocks from different scheduled slots are not equal. The sizes of code blocks from the same scheduled slot are equal. The code blocks transmitted within a slot are rate matched to as equal sizes as possible. The effective code rates for code blocks transmitted in different scheduled slots are roughly equal. CRC checksum is not computed for the transport block. Enhanced CRC checksum is computed and attached to each of the code blocks.

Although some embodiments are described for a single TB scheduled and/or transmitted over a plurality of time slots, some embodiments, such for multiple-input multiple-output (MIMO), may include transmitting (e.g., by a network node or WD operating in MIMO) multiple TBs, where each of such TBs may be transmitted in a different beam (spatial resource) over the same plurality of time slots.

Some examples may include one or more of the following:

Example A1. A network node configured to communicate with a wireless device (WD), the network node configured to, and/or comprising a radio interface and/or comprising processing circuitry configured to:
construct a single transport block for transmission over a time duration that exceeds a single time slot.

Example A2. The network node of Example A1, wherein the single transport block is scheduled over at least two time slots and a number of scheduled orthogonal frequency-division multiplexing (OFDM) symbols in at the at least two time slots is not equal.

Example A3. The network node of any one of Examples A1 and A2, wherein the transmission is one of a Physical Uplink Shared Channel (PUSCH) or Physical Downlink Shared Channel (PDSCH) transmission.

Example A4. The network node of any one of Examples A1-A3, wherein the network node, the radio interface and/or the processing circuitry is further configured to channel encode and rate match code blocks to as equal a number of coded bits as possible.

Example A5. The network node of any one of Examples A1-A4, wherein the network node, the radio interface and/or the processing circuitry is further configured to determine a number of code blocks in a code block set using at least one of a round, ceil, or floor function.

Example A6. The network node of any one of Examples A1-A5, wherein the network node, the radio interface and/or the processing circuitry is further configured to restrict encoded bits of a low density parity check (LDPC) codeword to a single time slot.

Example A7. The network node of any one of Examples A1-A6, wherein the network node, the radio interface and/or the processing circuitry is further configured to perform code block segmentation.

Example A8. The network node of any one of Examples A1-A7, wherein the network node, the radio interface and/or the processing circuitry is further configured to determine a number of information bits for a time slot using at least one of a code rate, modulation order, and number of spatial multiplexing layers.

Example A9. The network node of any one of Examples A1-A8, wherein the network node, the radio interface and/or the processing circuitry is further configured to determine a number of resource elements using at least one of a number of scheduled OFDM symbols in the time domain and a number of allocated primary resource blocks (PRBs) in the frequency domain.

Example B1. A method implemented in a network node, the method comprising:
constructing a single transport block for transmission over a time duration that exceeds a single time slot.

Example B2. The method of Example B1, wherein the single transport block is scheduled over at least two time slots and a number of scheduled orthogonal frequency-division multiplexing (OFDM) symbols in at the at least two time slots is not equal.

Example B3. The method of any one of Examples B1 and B2, wherein the transmission is one of a Physical Uplink Shared Channel (PUSCH) or Physical Downlink Shared Channel (PDSCH) transmission.

Example B4. The method of any one of Examples B1-B3, further comprising channel encoding and rate matching code blocks to as equal a number of coded bits as possible.

Example B5. The method of any one of Examples B1-B4, further comprising determining a number of code blocks in a code block set using at least one of a round, ceil, or floor function.

Example B6. The method of any one of Examples B1-B5, further comprising restricting encoded bits of a low density parity check (LDPC) codeword to a single time slot.

Example B7. The method of any one of Examples B1-B6, further comprising performing code block segmentation.

Example B8. The method of any one of Examples B1-B7, further comprising determining a number of information bits for a time slot using at least one of a code rate, modulation order, and number of spatial multiplexing layers.

Example B9. The method of any one of Examples B1-B8, further comprising determining a number of resource elements using at least one of a number of scheduled OFDM symbols in the time domain and a number of allocated primary resource blocks (PRBs) in the frequency domain.

Example C1. A wireless device (WD) configured to communicate with a network node, the WD configured to, and/or comprising a radio interface and/or processing circuitry configured to:
construct a single transport block for transmission over a time duration that exceeds a single time slot.

Example C2. The WD of Example C1, wherein the single transport block is scheduled over at least two time slots and a number of scheduled orthogonal frequency-division multiplexing (OFDM) symbols in at the at least two time slots is not equal.

Example C3. The WD of any one of Examples C1 and C2, wherein the transmission is one of a Physical Uplink Shared Channel (PUSCH) or Physical Downlink Shared Channel (PDSCH) transmission.

Example C4. The WD of any one of Examples C1-C3, wherein the WD, the radio interface and/or the processing circuitry is further configured to channel encode and rate match code blocks to as equal a number of coded bits as possible.

Example C5. The WD of any one of Examples C1-C4, wherein the WD, the radio interface and/or the processing circuitry is further configured to determine a number of code blocks in a code block set using at least one of a round, ceil, or floor function.

Example C6. The WD of any one of Examples C1-05, wherein the WD, the radio interface and/or the processing circuitry is further configured to restrict encoded bits of a low density parity check (LDPC) codeword to a single time slot.

Example C7. The WD of any one of Examples C1-C6, wherein the WD, the radio interface and/or the processing circuitry is further configured to perform code block segmentation.

Example C8. The WD of any one of Examples C1-C7, wherein the WD, the radio interface and/or the processing circuitry is further configured to determine a number of information bits for a time slot using at least one of a code rate, modulation order, and number of spatial multiplexing layers.

Example C9. The WD of any one of Examples C1-C8, wherein the WD, the radio interface and/or the processing circuitry is further configured to determine a number of resource elements using at least one of a number of scheduled OFDM symbols in the time domain and a number of allocated primary resource blocks (PRBs) in the frequency domain.

Example D1. A method implemented in a wireless device (WD), the method comprising:
constructing a single transport block for transmission over a time duration that exceeds a single time slot.

Example D2. The method of Example D1, wherein the single transport block is scheduled over at least two time slots and a number of scheduled orthogonal frequency-division multiplexing (OFDM) symbols in the at least two time slots is not equal.

Example D3. The method of any one of Examples D1 and D2, wherein the transmission is one of a Physical Uplink Shared Channel (PUSCH) or Physical Downlink Shared Channel (PDSCH) transmission.

Example D4. The method of any one of Examples D1-D3, further comprising channel encoding and rate matching code blocks to as equal a number of coded bits as possible.

Example D5. The method of any one of Examples D1-D4, further comprising determining a number of code blocks in a code block set using at least one of a round, ceil, or floor function.

Example D6. The method of any one of Examples D1-D5, further comprising restricting encoded bits of a low density parity check (LDPC) codeword to a single time slot.

Example D7. The method of any one of Examples D1-D6, further comprising performing code block segmentation.

Example D8. The method of any one of Examples D1-D7, further comprising determining a number of information bits for a time slot using at least one of a code rate, modulation order, and number of spatial multiplexing layers.

Example D9. The method of any one of Examples D1-D8, further comprising determining a number of resource elements using at least one of a number of scheduled OFDM symbols in the time domain and a number of allocated primary resource blocks (PRBs) in the frequency domain.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A radio node comprising processing circuitry and a radio interface, the radio interface and the processing circuitry being configured to operate together to configure the radio node to:
    determine a transport block, TB, size based at least in part on a number of resource elements in a plurality of time slots, the radio node being configured to determine the TB size by being configured to determine a number of resource elements in the plurality of time slots using an average of a number of orthogonal frequency division multiplexing, OFDM, symbols scheduled in each of the plurality of time slots;
    determine a segmentation of a transport block, TB, having the TB size, the segmentation producing a plurality of segmented code blocks, CBs;
    determine a channel coding for each of the plurality of segmented CBs, the channel coding producing a plurality of coded CBs;
    one of transmit and receive the plurality of coded CBs over the plurality of time slots according to the determined segmentation and the determined channel coding.

2. The radio node of claim 1, wherein the radio node is configured to determine the TB size by being configured to determine the number of resource elements in the plurality of time slots as a sum of a number of resource elements scheduled in each of the plurality of time slots.

3. The radio node of claim 1, wherein the radio node is configured to when the TB is scheduled over more than one time slot:
    determine a TB cyclic redundancy check, CRC, the TB CRC being appended to the TB prior to the segmentation that produces the plurality of segmented CBs.

4. The radio node of claim 3, wherein:
    each of the produced plurality of segmented CBs are equally sized; and
    the radio node is configured to determine a rate matching of the produced plurality of coded CBs, the rate matching producing an equal number of coded bits per coded code block, CB.

5. The radio node of claim 4, wherein at least one of the plurality of coded CBs crosses a time slot boundary.

6. The radio node of claim 3, wherein:
    the produced plurality of segmented CBs are equally sized; and
    the radio node is configured to determine a rate matching of the produced plurality of coded CBs, the rate matching producing an unequal number of coded bits per coded CB in at least two coded CBs of the plurality of coded CBs, each coded CB being restricted to one time slot.

7. The radio node of claim 6, wherein:
    when at least two coded CBs of the plurality of coded CBs are within a same time slot, the radio node is configured to determine that the at least two coded CBs in the same time slot are rate matched into an equal number of coded bits per coded CB in the same time slot: and
    the at least two coded CBs having an unequal number of coded bits per coded CB are in different time slots.

8. The radio node of claim 6, wherein the plurality of coded CBs are produced according to a division of a total number of the CBs scheduled for the one of the transmission and the reception into a plurality of CB sets, each CB set being transmitted within a respective time slot of the plurality of time slots.

9. The radio node of claim 8, wherein a number of CBs in an i-th CB set is based at least in part on a number of orthogonal frequency- division multiplexing, OFDM, symbols that are scheduled in a time slot i of the plurality of time slots.

10. The radio node of claim 3, wherein:
    the produced plurality of segmented CBs are unequally sized; and
    the radio node is configured to determine a rate matching of the plurality of coded CBs, the rate matching producing an unequal number of coded bits per coded CB in at least two of the plurality of coded CBs, each coded CB being restricted to one time slot.

11. The radio node of claim 10, wherein:
    when at least two coded CBs of the plurality of coded CBs are within a same time slot, the radio node is configured to determine that the at least two coded CBs in the same time slot are rate matched into an equal number of coded bits per coded CB in the same time slot: and
    the at least two coded CBs having an unequal number of coded bits per coded CB are in different time slots.

12. The radio node of claim 3, wherein when the TB is scheduled over more than one time slot:
    the segmentation of the TB to produce the plurality of segmented CBs is regardless of the TB size; and
    a TB cyclic redundancy check, CRC, checksum size is 24 bits regardless of the TB size.

13. The radio node of claim 1, wherein the radio node is configured to when the TB is scheduled over more than one time slot:
 determine that a cyclic redundancy check, CRC, is not appended to the TB; and
wherein
 the segmentation of the TB to produce the plurality of segmented CBs is regardless of the TB size, the TB on which the segmentation is performed lacking a TB cyclic redundancy check, CRC.

14. The radio node of claim 13, wherein:
the produced plurality of segmented CBs are unequally sized; and
the radio node is configured to when the TB is scheduled over more than one time slot:
 determine a rate matching of the plurality of coded CBs, the rate matching producing an unequal number of coded bits per coded CB in at least two of the plurality of coded CBs, each coded CB being restricted to one time slot.

15. The radio node of claim 14, wherein:
when at least two coded CBs of the plurality of coded CBs are within a same time slot, the radio node is configured to determine that the at least two coded CBs in the same time slot are rate matched into an equal number of coded bits per coded CB in the same time slot: and
the at least two coded CBs having an unequal number of coded bits per coded CB are in different time slots.

16. The radio node of claim 13, wherein when the TB is scheduled over more than one time slot:
a CB cyclic redundancy check, CRC, checksum size is greater than 24 bits for each of the plurality of segmented CBs regardless of the TB size.

17. The radio node of claim 10, wherein the radio node is further configured to determine a number of CBs and an associated CB size for each time slot separately, the determination being based at least in part on a number of orthogonal frequency-division multiplexing, OFDM, symbols that are scheduled in the respective time slot.

18. A method implemented by a radio node, the method comprising:
 determining a transport block, TB, size based at least in part on a number of resource elements in a plurality of time slots, determining the TB size comprising determining a number of resource elements in the plurality of time slots using an average of a number of orthogonal frequency division multiplexing, OFDM, symbols scheduled in each of the plurality of time slots;
 determining a segmentation of a transport block, TB, having the TB size, the segmentation producing a plurality of segmented code blocks, CBs;
 determining a channel coding for each of the plurality of segmented CBs, the channel coding producing a plurality of coded CBs; and
 one of transmitting and receiving the plurality of coded CBs over the plurality of time slots according to the determined segmentation and the determined channel coding.

19. A non-transitory computer readable storage medium comprising computer instructions, the computer instructions when executed being configured to implement a method, the method comprising:
 determining a transport block, TB, size based at least in part on a number of resource elements in a plurality of time slots, determining the TB size comprising determining a number of resource elements in the plurality of time slots using an average of a number of orthogonal frequency division multiplexing, OFDM, symbols scheduled in each of the plurality of time slots;
 determining a segmentation of a transport block, TB, having the TB size, the segmentation producing a plurality of segmented code blocks, CBs;
 determining a channel coding for each of the plurality of segmented CBs, the channel coding producing a plurality of coded CBs; and
 one of transmitting and receiving the plurality of coded CBs over the plurality of time slots according to the determined segmentation and the determined channel coding.

* * * * *